(12) United States Patent
Herrmann et al.

(10) Patent No.: US 11,579,010 B1
(45) Date of Patent: Feb. 14, 2023

(54) CHAIN HOIST WITH INTEGRAL LOAD CELL

(71) Applicant: Motion Laboratories, Inc., Cortlandt, NY (US)

(72) Inventors: Peter Herrmann, White Plains, NY (US); Philip Nubile, Mammaroneck, NY (US)

(73) Assignee: Motion Laboratories, Inc., Cortlandt, NY (US)

( * ) Notice: Subject to any disclaimer, the term of this patent is extended or adjusted under 35 U.S.C. 154(b) by 365 days.

(21) Appl. No.: 16/822,366

(22) Filed: Mar. 18, 2020

Related U.S. Application Data

(60) Provisional application No. 62/937,817, filed on Nov. 20, 2019, provisional application No. 62/821,553, filed on Mar. 21, 2019.

(51) Int. Cl.
  *G01G 19/18* (2006.01)
  *B66D 3/26* (2006.01)
  (Continued)

(52) U.S. Cl.
  CPC ............. *G01G 19/18* (2013.01); *B66C 13/16* (2013.01); *B66D 3/26* (2013.01); *B66C 1/40* (2013.01)

(58) Field of Classification Search
  CPC .......... G01G 19/14; G01G 19/18; B66C 1/40; B66C 13/16; B66D 3/26
  See application file for complete search history.

(56) References Cited

U.S. PATENT DOCUMENTS

| 1,580,411 A | 4/1926 | Coffing |
| 2,342,091 A | 2/1944 | Schroeder |

(Continued)

FOREIGN PATENT DOCUMENTS

| EP | 2023099 A2 * | 2/2009 | ............. G01G 19/18 |
| FR | 2607926 A1 * | 6/1988 | ............. G01G 19/18 |

(Continued)

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Natalie Huls
(74) *Attorney, Agent, or Firm* — Thomas A. O'Rourke; Bodner+O'Rourke, LLP

(57) ABSTRACT

A load cell includes a bearing element configured for a hoist that includes a hook, a suspension with an orifice that receives a shaft of the hook, a nut, and housing. The bearing element, preferably a ring, contacts the suspension, and has an orifice that receives the shaft therethrough with the nut secured to the shaft proximate to the bearing element. Strain gauges are mounted on the ring side wall being equally spaced. A second suspension orifice concentric with the first orifice receives the ring with strain gauges therein. For improved accuracy, a thrust roller bearing and two thrust washers are positioned on sides of the ring, all of which are preferably positioned in a cup member that is received in the second orifice. A clearance fit is provided with respect to each of protruding upper and lower overhanging cylindrical ring lips and the cup to protect the gauges.

17 Claims, 35 Drawing Sheets

(51) Int. Cl.
*B66C 13/16* (2006.01)
*B66C 1/40* (2006.01)

(56) References Cited

U.S. PATENT DOCUMENTS

| | | | | |
|---|---|---|---|---|
| 2,570,833 | A | | 10/1951 | Metcalf |
| 2,667,331 | A | | 1/1954 | Robins |
| 2,814,946 | A | | 12/1957 | Harris |
| 2,991,976 | A | | 7/1961 | Carroll |
| 3,080,935 | A | * | 3/1963 | Abbonizio ............. G01G 19/14 254/409 |
| 3,427,875 | A | | 2/1969 | Saxl |
| 3,802,379 | A | * | 4/1974 | Sandberg ............... G01G 19/18 411/548 |
| 3,827,514 | A | * | 8/1974 | Bradley ............. G01G 23/3728 73/862.631 |
| 3,918,301 | A | * | 11/1975 | Baer ....................... G01L 1/04 294/82.16 |
| 4,102,295 | A | * | 7/1978 | Crook, Jr. .............. G01G 19/14 116/281 |
| 4,153,123 | A | * | 5/1979 | Bereyziat ............... G01G 19/16 177/208 |
| 4,454,771 | A | | 6/1984 | Shijmazoe |
| 5,429,007 | A | | 7/1995 | Khachaturian |
| 6,209,852 | B1 | | 4/2001 | George |
| 6,769,315 | B2 | | 8/2004 | Stevenson |
| 9,067,766 | B1 | * | 6/2015 | Bateman ............... B66C 15/065 |
| 9,464,403 | B2 | * | 10/2016 | Shatters ................ G01G 23/01 |
| 10,450,174 | B1 | * | 10/2019 | Kucinic ................ B66C 13/16 |
| 2002/0149216 | A1 | * | 10/2002 | Teixeira ................ G01G 19/16 294/907 |

FOREIGN PATENT DOCUMENTS

| | | | | |
|---|---|---|---|---|
| GB | 2549475 | A | * 10/2017 | ............. A61G 7/108 |
| JP | 2009-52977 | | 3/2009 | |
| WO | WO-2017217849 | A1 | * 12/2017 | |
| WO | WO-2020129055 | A1 | * 6/2020 | |

OTHER PUBLICATIONS

"Three General Types of Fit," available at www.mmto.org/dclark/Reports/Encoder%20Upgrade/fittolerences%20%5BRead-Only%5D.pof., Jul. 8, 2019.
"Engineering Fit," available at: https://en.wikipedia.org/wiki/Engineering_fit, Jul. 8, 2019.

* cited by examiner

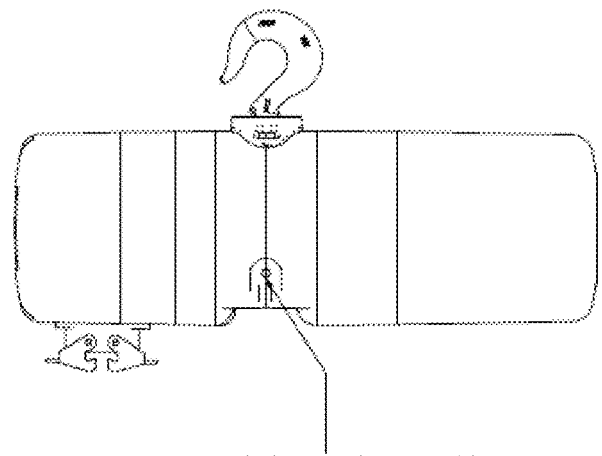

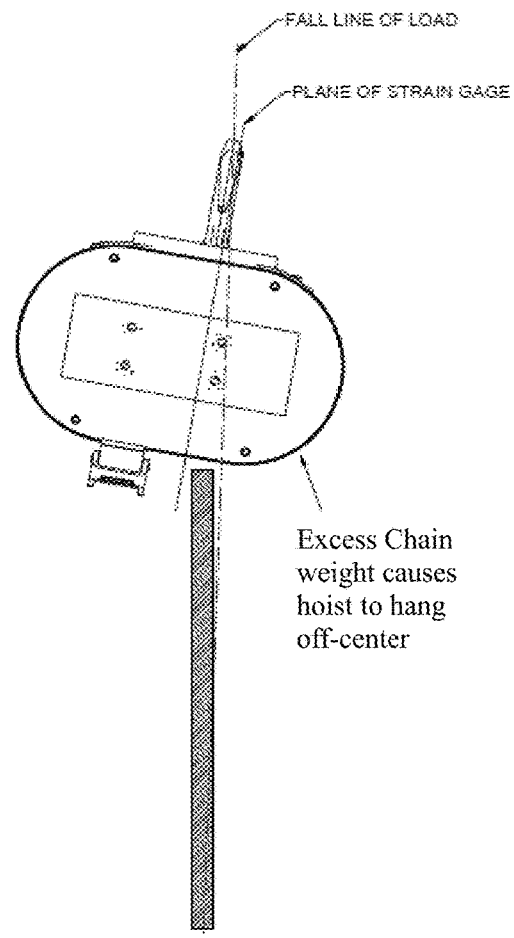

Excess Chain may be stored in a bag suspended from this point- the weight contributes to the angle that the hoist sits at until it is fully loaded. (Note- the chain weighs approximately one pound per foot, and as much as 150 feet of chain may be stored)

Excess Chain weight causes hoist to hang off-center

Challenge- to determine the best placement for the strain gauge, to effectively capture the load imposed on the chain hoist hook.

First Embodiment: a strain gauge is attached to the shaft of the hook, and imposed loads result in stretching of the shaft- Initial results were good, but side and torsional loading were problematic.

Second Embodiment: strain gauges are installed onto the suspension to capture the deflection of the suspension body as the load is imposed.

Third Embodiment: A compression type load cell washer is placed between the suspension and the nut- as weight is applied to the hook the washer is compressed, and data is gathered.

Fourth Embodiment: A compression ring load cell is placed into a containment cup system with an improved suspension housing geometry.

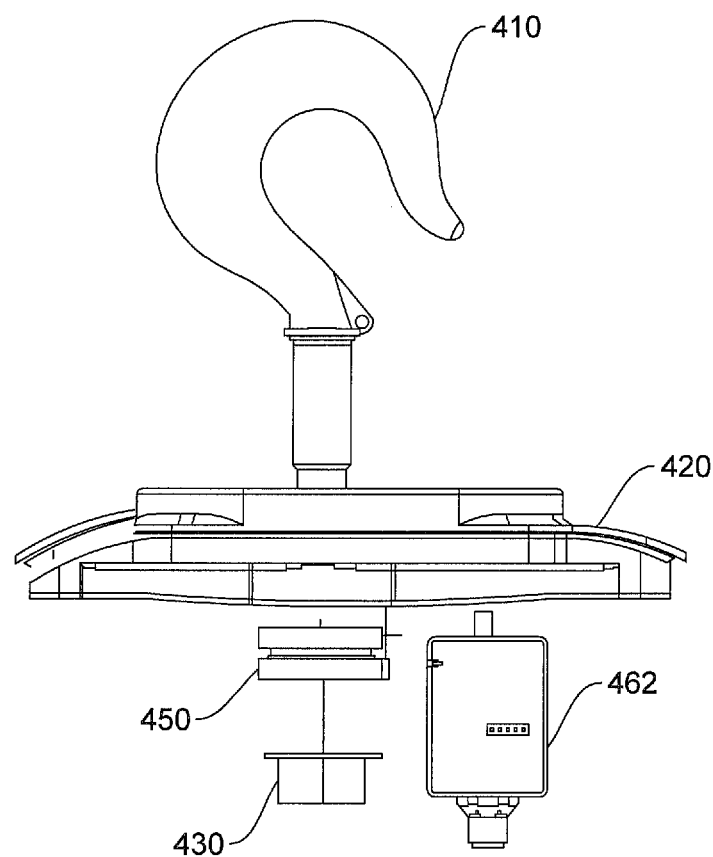
FIG. 20
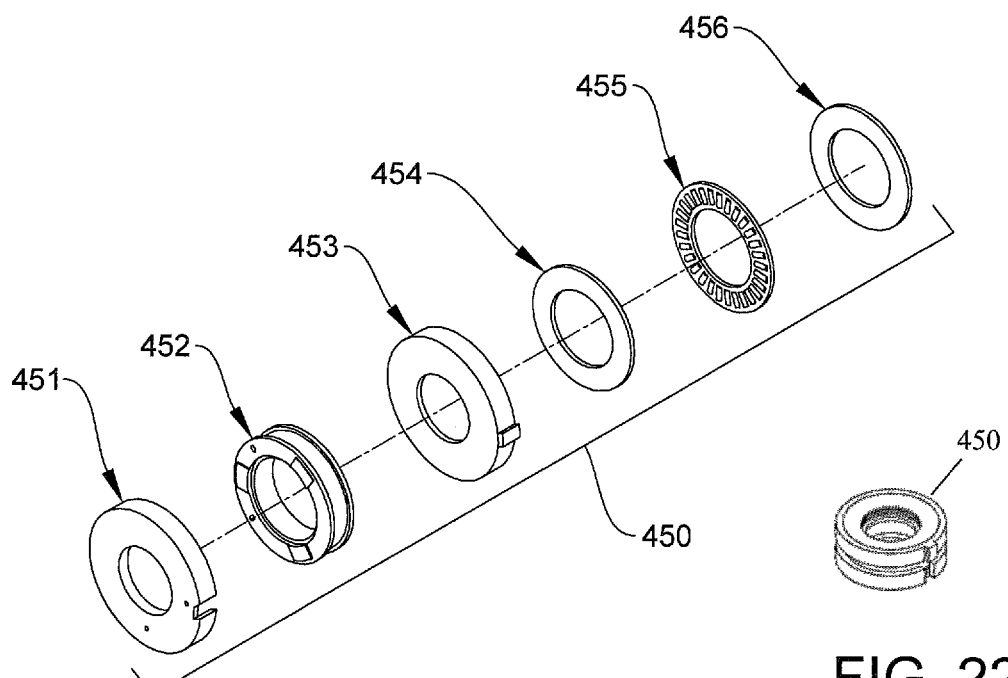
FIG. 21
FIG. 22

FIG. 26
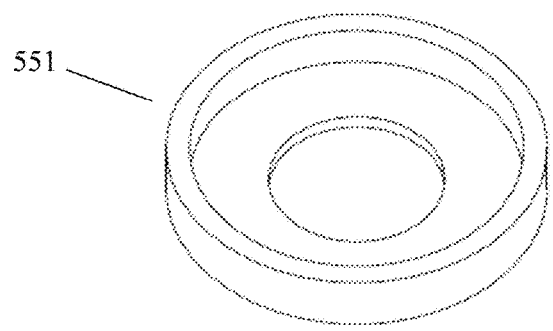
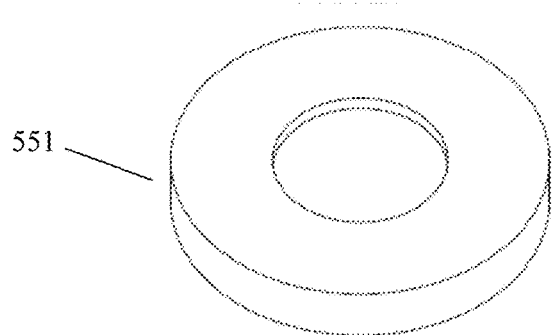
FIG. 28
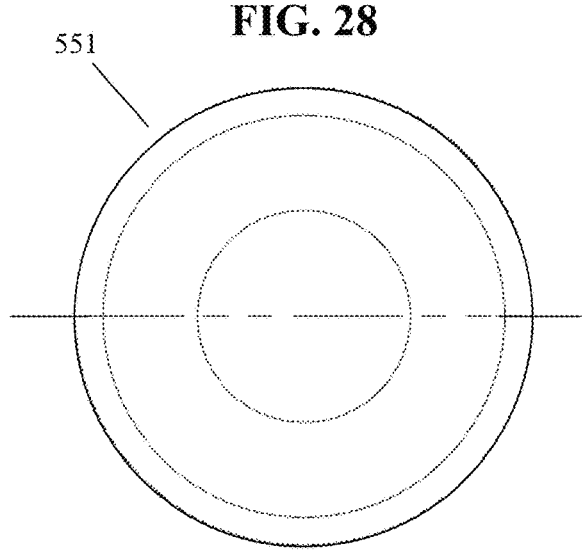
FIG. 27
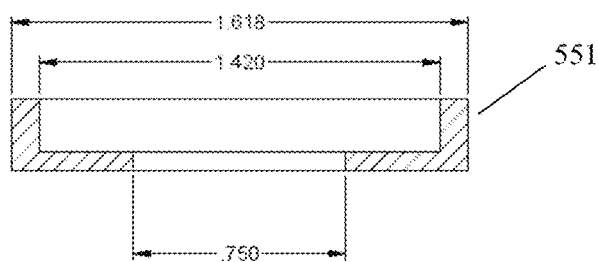
FIG. 29

FIG. 36
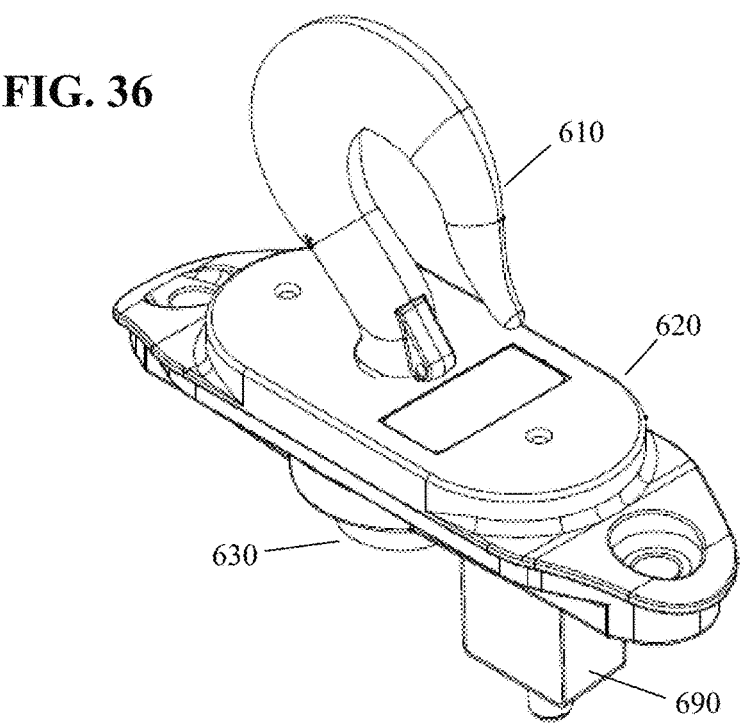
FIG. 37
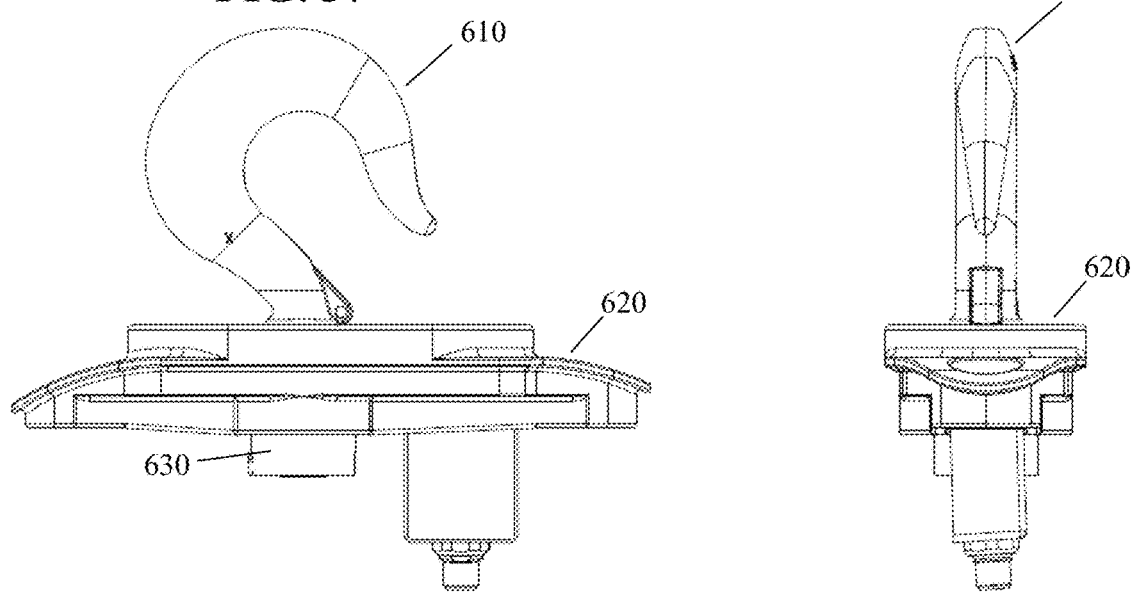
FIG. 38
FIG. 39
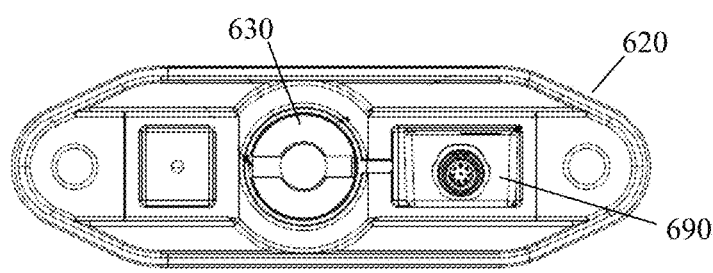

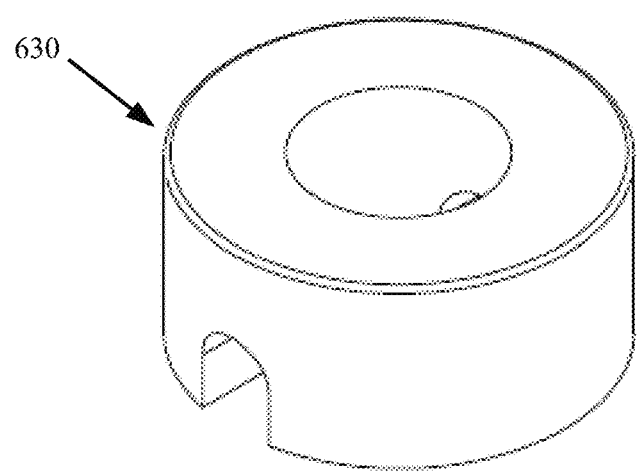
FIG. 49
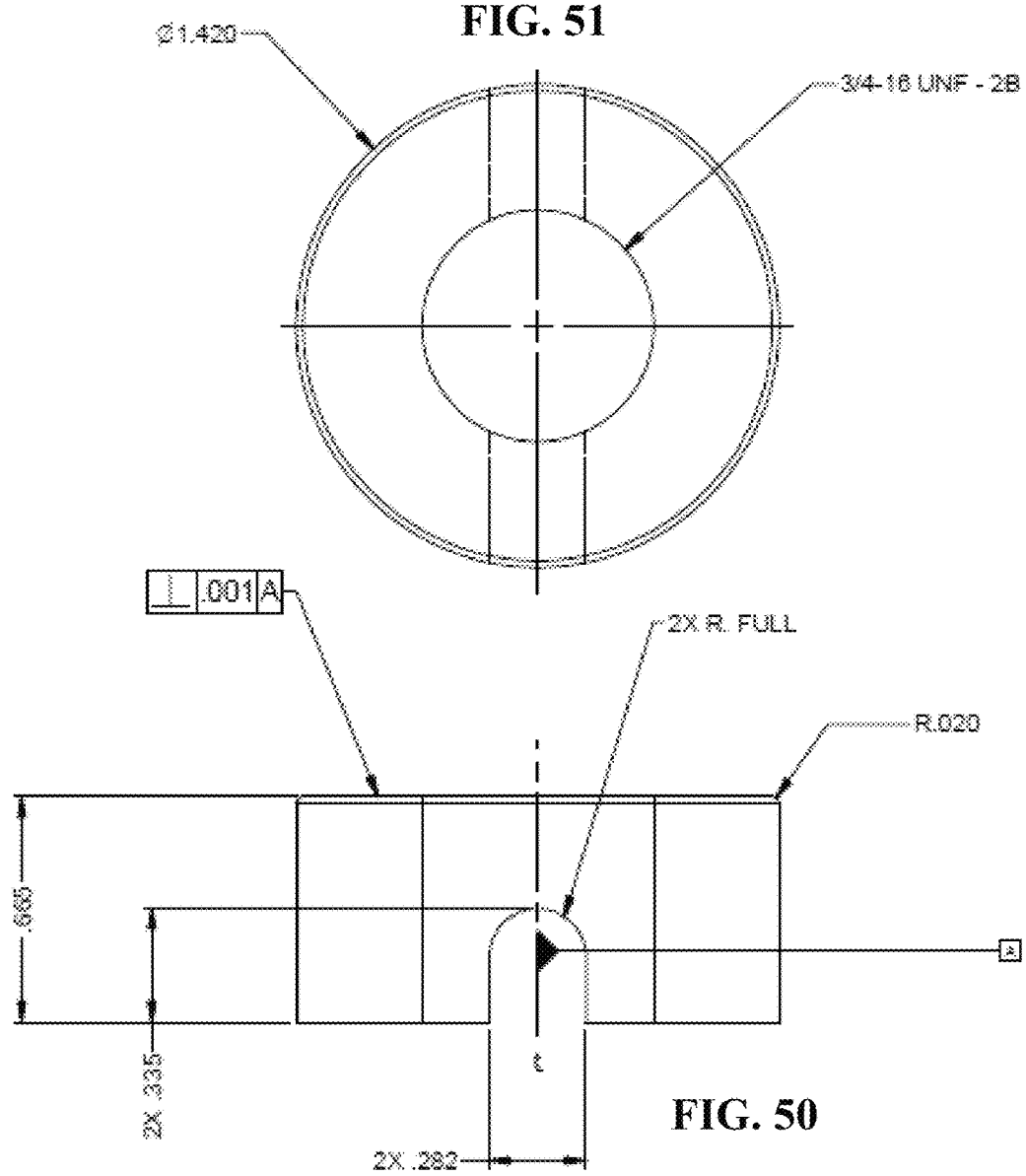
FIG. 51
FIG. 50

FIG. 52E
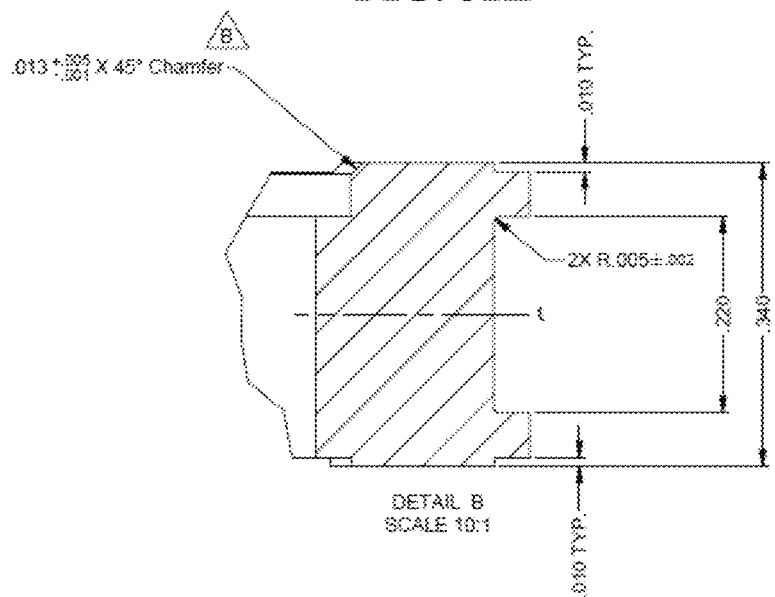
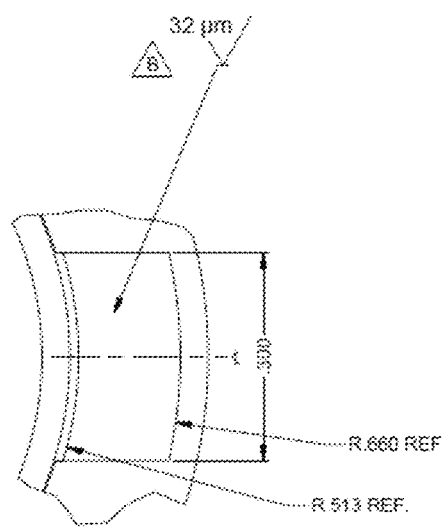
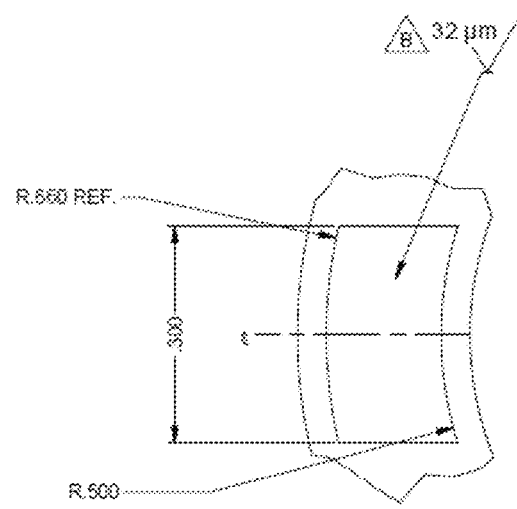
FIG. 52F
FIG. 52G
FIG. 52H
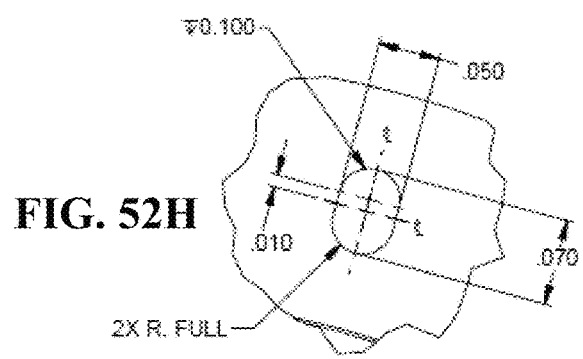

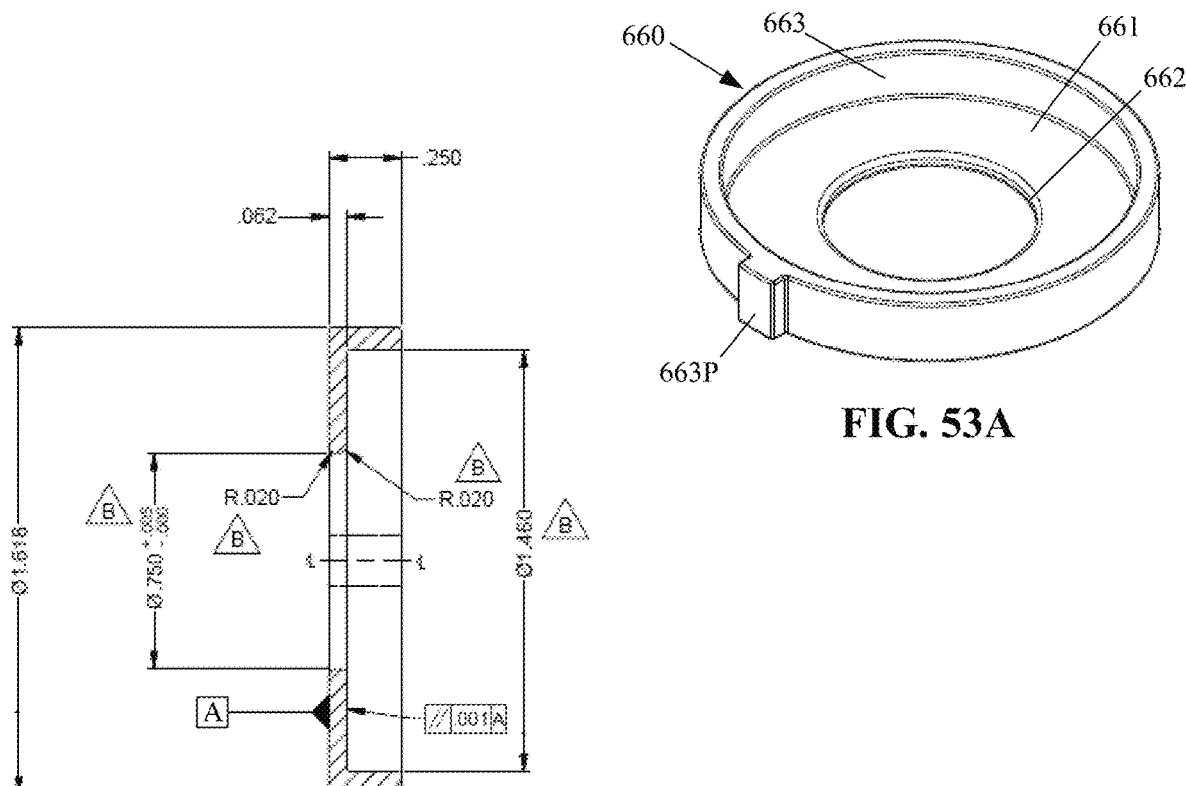
FIG. 53A
FIG. 53D
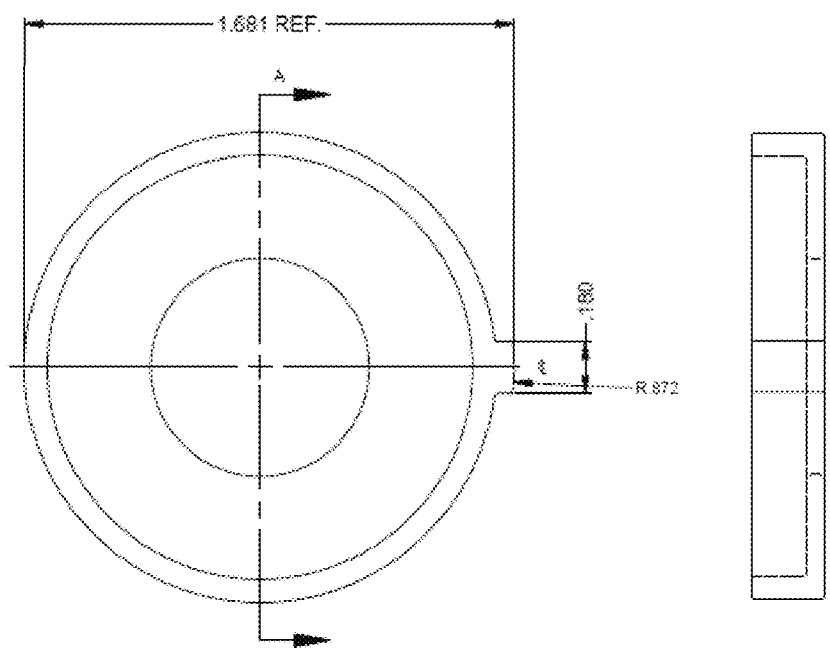
FIG. 53B
FIG. 53C

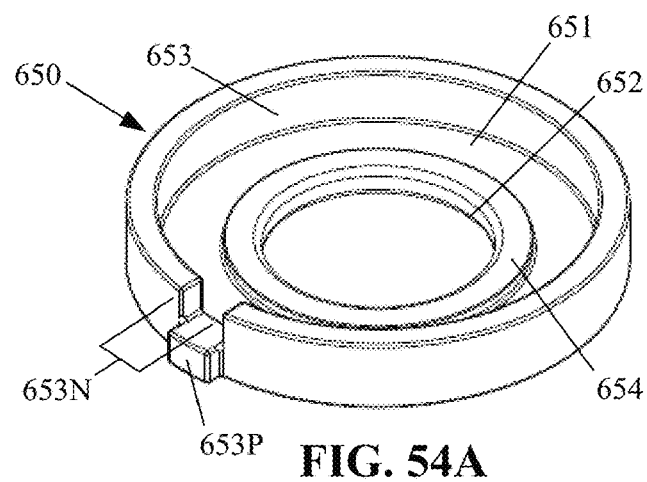
FIG. 54A
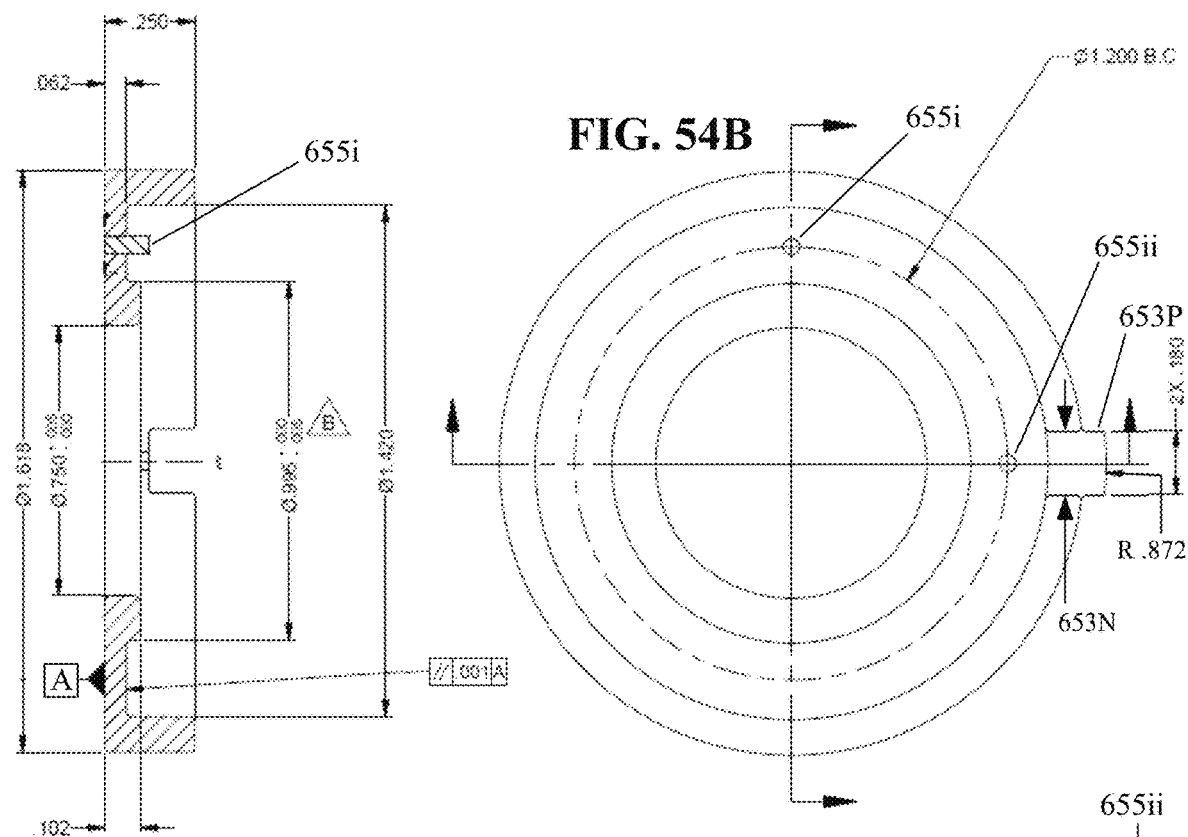
FIG. 54B
FIG. 54C
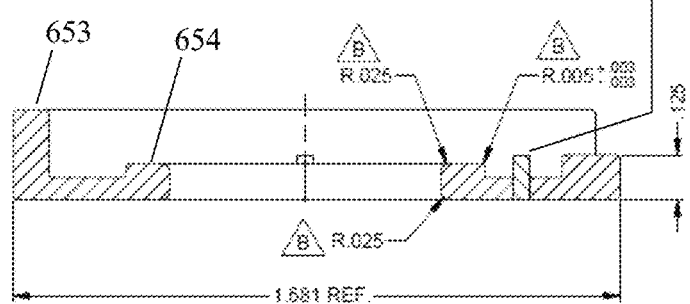
FIG. 54D

CHAIN HOIST WITH INTEGRAL LOAD CELL

CROSS REFERENCES TO RELATED APPLICATIONS

This application claims priority on U.S. Provisional Patent Application Ser. No. 62/821,553, filed on Mar. 21, 2019, and on U.S. Provisional Patent Application Ser. No. 62/937,817, filed on Nov. 20, 2019, all disclosures of which are incorporated herein by reference.

FIELD OF THE INVENTION

The subject technology relates to load cell devices for use with lifting equipment (e.g., hoists) and other tension applications, and more particularly relates to an improved system that integrates the load cell within the hoist body so no headroom is lost, accuracy is improved and off axis loading is minimized

BACKGROUND OF THE INVENTION

In general a load cell acts as a transducer, being able to convert a force (i.e., a load) into an electrical signal. There are three basic types of load cells-hydraulic load cells, pneumatic load cells, and strain gauge load cells. A strain gauge load cell in a rigging application measures the force using a spring element and a strain gauge. The strain gauge is typically arranged as one element of a Wheatstone bridge circuit and is usually formed of a cooper-nickel alloy, which has a resistance that generally remains constant over a wide temperature range. Where the force to be measured is very high, the spring element is correspondingly sturdy (i.e., is not very elastic), typically being made of aluminum or steel. The strain gauges are securely mounted to the spring element, often using epoxy or cyanoacrylate adhesive. As the spring element deforms elastically under the load, the small changes to its physical dimensions (e.g., elongation or compression) are similarly experienced by and measured by the strain gauges, by evaluating the change to the electrical resistance of its wiring (i.e., stretching increases electrical resistance, and compressing decreases electrical resistance). Electronic calculations are made to determine the magnitude of the load based on the measured amount of strain.

Strain gauge load cells used for rigging are mechanically connected in line with the force to be measured and transmit data either digitally or as an analog signal. For example, a strain gauge load cell may be positioned in line with the rigging line/wire that supports a sail or the structure of an airship. A strain gauge load cell may also be used in entertainment rigging systems to verify loads imposed on the building structure by lighting equipment, audio equipment, video walls and other types of loads suspended from the overhead truss and lifted by electric chain hoists.

However, hoist users often complain that the arrangement including the length of the load cell device is excessive, and uses up valuable head room.

The subject technology is devised to be more compact and reduce the loss of headroom typically experienced with the use of a load cell, but is without a corresponding loss of accuracy.

Historically, the application of a compression load cell integrated within the hoist body results in inaccurate readings due to off axis loading and the inherent material properties of the hoist suspension. The hoist suspension is malleable to prevent fatigue and failure. However this malleable property does not transfer the forces to the installed load cell properly resulting in inaccurate and non-repeatable data.

OBJECTS OF THE INVENTION

It is an object of the invention to provide a compression load cell to measure hoist loads.

It is another object of the invention to provide a system that integrates a load cell within a hoist body to eliminate lost headroom.

It is a further object of the invention to provide a compact compression load cell that reduces headroom loss, without impacting measurement accuracy.

It is a further object of the invention to provide an interface and containment system that allows forces to transfer from the suspension to the load cell in the most accurate manner.

Further objects and advantages of the invention will become apparent from the following description and claims, and from the accompanying drawings.

BRIEF DESCRIPTION OF THE DRAWINGS

The description of the various example embodiments is explained in conjunction with appended drawings, in which:

FIG. 6 illustrates a load point on the chain hoist for a chain storage bag;

FIG. 7 illustrates misalignment of a tall line of a load imposed on a hook of a hoist and a plane of a strain gauge;

FIG. 20 is an exploded side view of the hook, nut, suspension, electronics package, and the load cell assembly shown in FIGS. 17-19;

FIG. 21 is an exploded perspective view of the component parts of the load cell assembly shown in FIGS. 17-20;

FIG. 22 is a perspective view of the load cell assembly shown in FIG. 20;

FIG. 26 is a top perspective view of the cup member used in the load cell assembly shown in FIGS. 24-25:

FIG. 27 is a bottom perspective view of the cup member used in the load cell assembly shown in FIGS. 24-25;

FIG. 28 is a top view of the cup member shown in FIGS. 24-25;

FIG. 29 is a cross-sectional view through the cup member shown in FIG. 28;

FIG. 36 is a perspective view illustrating another embodiment of a hook, nut, suspension, load cell assembly, and electronic circuitry package for a chain hoist;

FIG. 37 is a front view of the hook, nut, suspension, load cell assembly, and electronic circuitry package of FIG. 36;

FIG. 38 is a side view of the hook, nut, suspension, load cell assembly, and electronic circuitry package of FIG. 36;

FIG. 39 is a bottom view of the hook, nut, suspension, load cell assembly, and electronic circuitry package of FIG. 36;

FIG. 49 is a perspective view of the nut of FIG. 36;

FIG. 50 is a front view of the nut of FIG. 49;

FIG. 51 is a top view of the nut of FIG. 49;

FIG. 52E is an enlarged portion of the cross-sectional view of FIG. 52D;

FIG. 52F is an enlarged detail view of one of the pads shown in the front view of the compression ring shown in FIG. 52A;

FIG. 52G is an enlarged detail view of one of the pads shown in the rear view of the compression ring shown in FIG. 52C;

FIG. 52H is an enlarged detail view of the hole shown in the front view of the compression ring of FIG. 52A:

FIG. 53A is a perspective view of the top cup used in the load cell assembly of FIG. 36;

FIG. 53B is a front view of the top cup of FIG. 53A;

FIG. 53C is a side view of the top cup of FIG. 53A;

FIG. 53D is a cross-sectional view of the top cup of FIG. 53A;

FIG. 54A is a perspective view of the bottom cup used in the load cell assembly of FIG. 36:

FIG. 54B is a front view of the bottom cup of FIG. 54A:

FIG. 54C is a first cross-sectional view through the bottom cup of FIG. 54A;

FIG. 54D is a second cross-sectional view through the bottom cup of FIG. 54A;

DETAILED DESCRIPTION OF THE INVENTION

Figure 1:
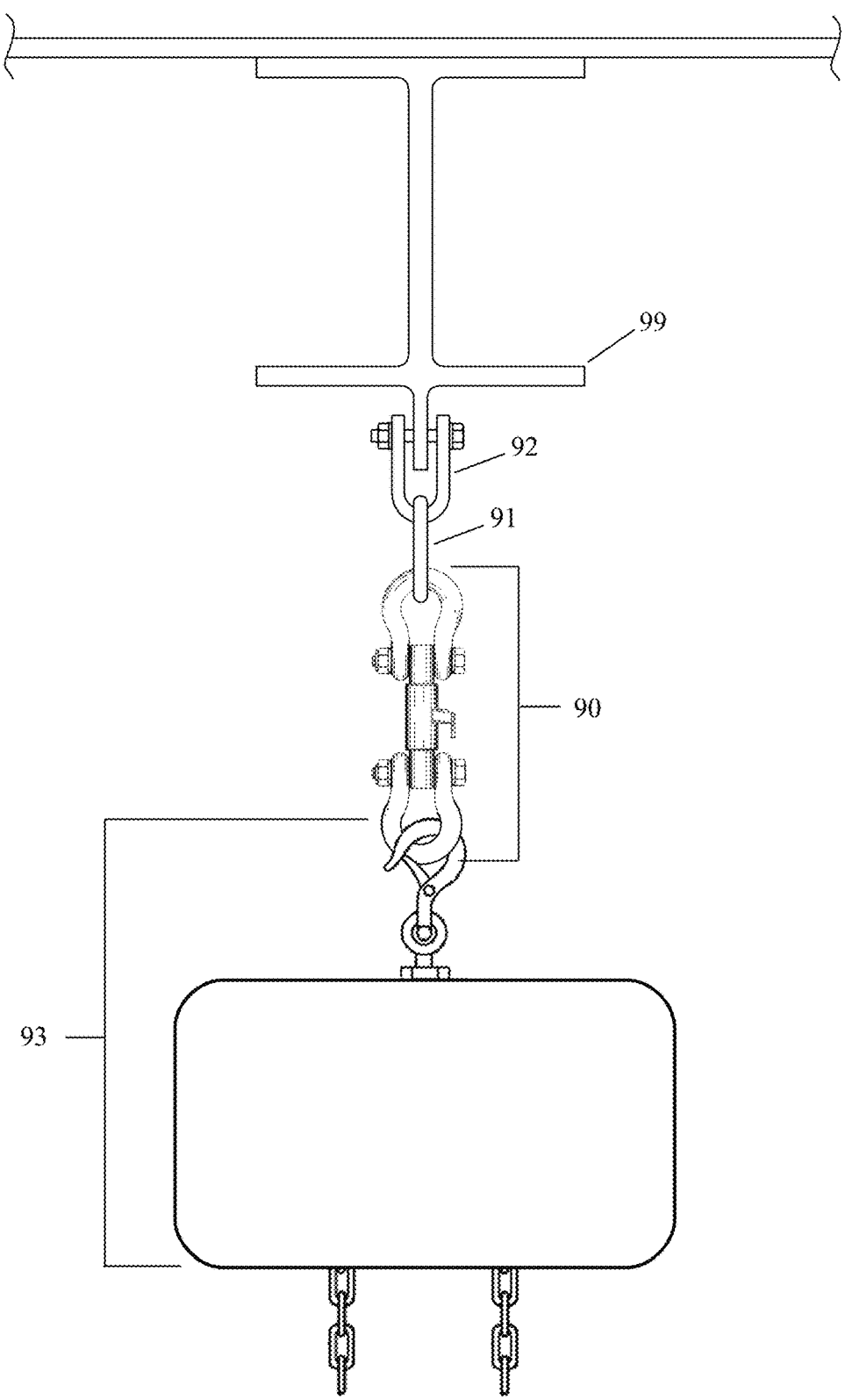
FIG. 1 illustrates a prior art arrangement for a chain hoist and a load cell being secured to an I-beam, and the associated loss of headroom.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, the described features, advantages, and characteristics of any particular embodiment disclosed herein, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator." available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder %20Upgrade/fittolerences %20%5BRead-Only %5D.pdf. Load cells used for rigging generally are standalone equipment used to measure weight of a given point, typically up to about 4,000 pounds. As seen in FIG. 1 for a typical rigging arrangement, a shackle clip 92 is bolted to an I-beam 99 of a building or other structure, and a load cell 90 is coupled thereto using a connector loop 91, while a chain hoist 93 is releasably coupled to the lower U-shaped member of the load cell. Some prior art hoists are shown, for example, within U.S. Pat. No. 1,580,411 to Coffing; U.S. Pat. No. 2,342,091 to Schroeder; U.S. Pat. No. 2,570,833 to Metcalf; U.S. Pat. No. 2,667,331 to Robins; U.S. Pat. No. 2,991,976 to Carroll; and U.S. Pat. No. 6,209,852 to George.

However, hoist users often complain that the length of such an arrangement, including the load cell, is excessive and uses up valuable head room. Even where the load cell may be coupled directly to the structure 99, the length of the load cell itself still utilizes valuable headroom that is wasteful in height critical situations.

To reduce this loss of headroom, devices have been configured to directly measure the load on a pin of the shackle clip 92 and eliminate the length of space occupied by the load cell 90 shown in FIG. 1. However, this arrangement tends to reduce accuracy, particularly when the load path becomes off center.

Figure 2:
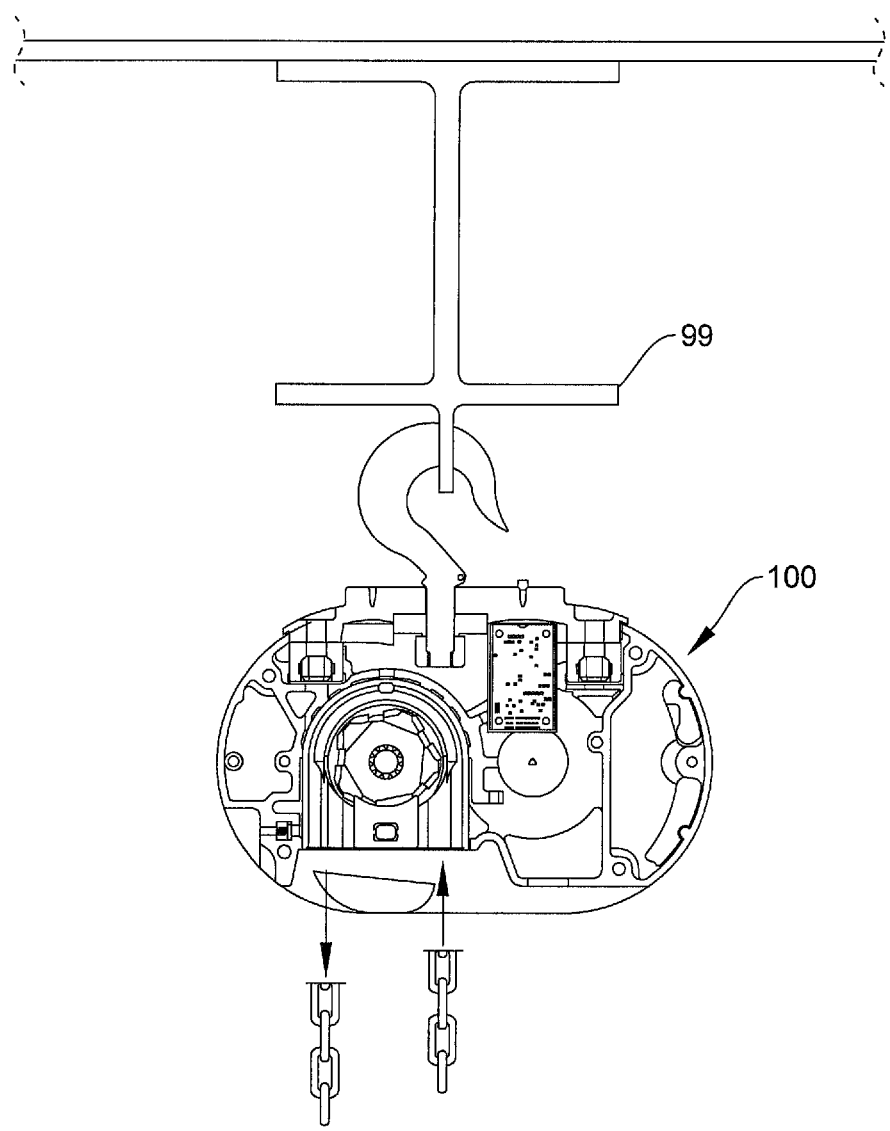
FIG. 2 illustrates an embodiment of the subject technology in which a chain hoist is formed to integrally include particularly configured load cell apparatus.
Figure 3:
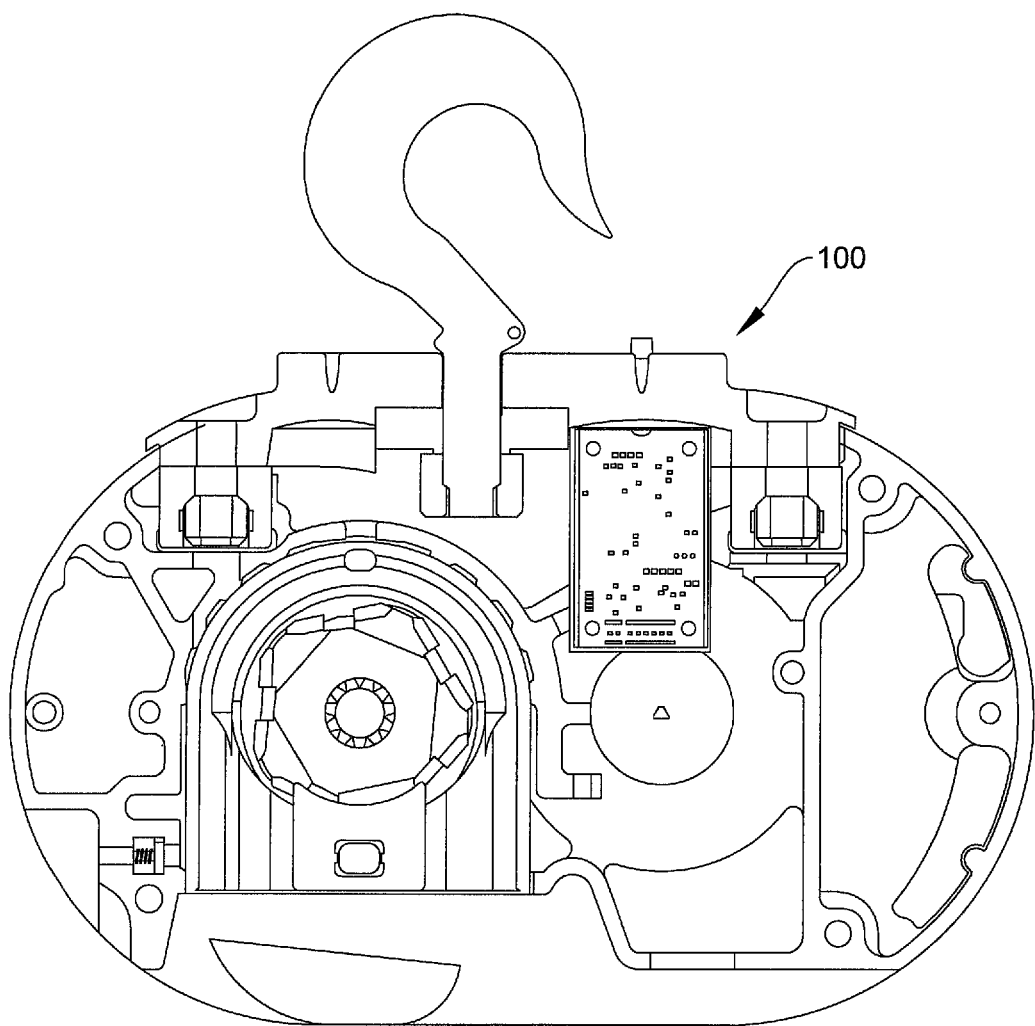
FIG. 3 is an enlarged detail view of the chain hoist with integral load cell as shown in FIG. 2.

To further reduce the loss of head room, and add a level of convenience with improved safety and accuracy, a hoist with a load cell fully integrated into the suspension of the chain hoist itself has been developed and is disclosed herein. The chain hoist with integral load cell 100 is shown coupled to the I-beam structure 99 in FIG. 2, and is shown by itself in the enlarged detail view of FIG. 3.

Numerous challenges were overcome to develop the chain hoist with integral load cell 100, in order to provide a device that reduced the headroom loss without impacting measurement accuracy.

Integrating a load cell into a hoist is challenging for many reasons—the hoist needs to be compact to fit in tight spaces, be able to withstand the intended weight capacity, and it needs to mitigate off axis forces that can occur. The chain hoist with integral load cell 100 overcomes these obstacles and makes the integrated hoist load cell practical. FIGS. 4-7 are provided to illustrate some of the issues encountered during development.

Figure 4:
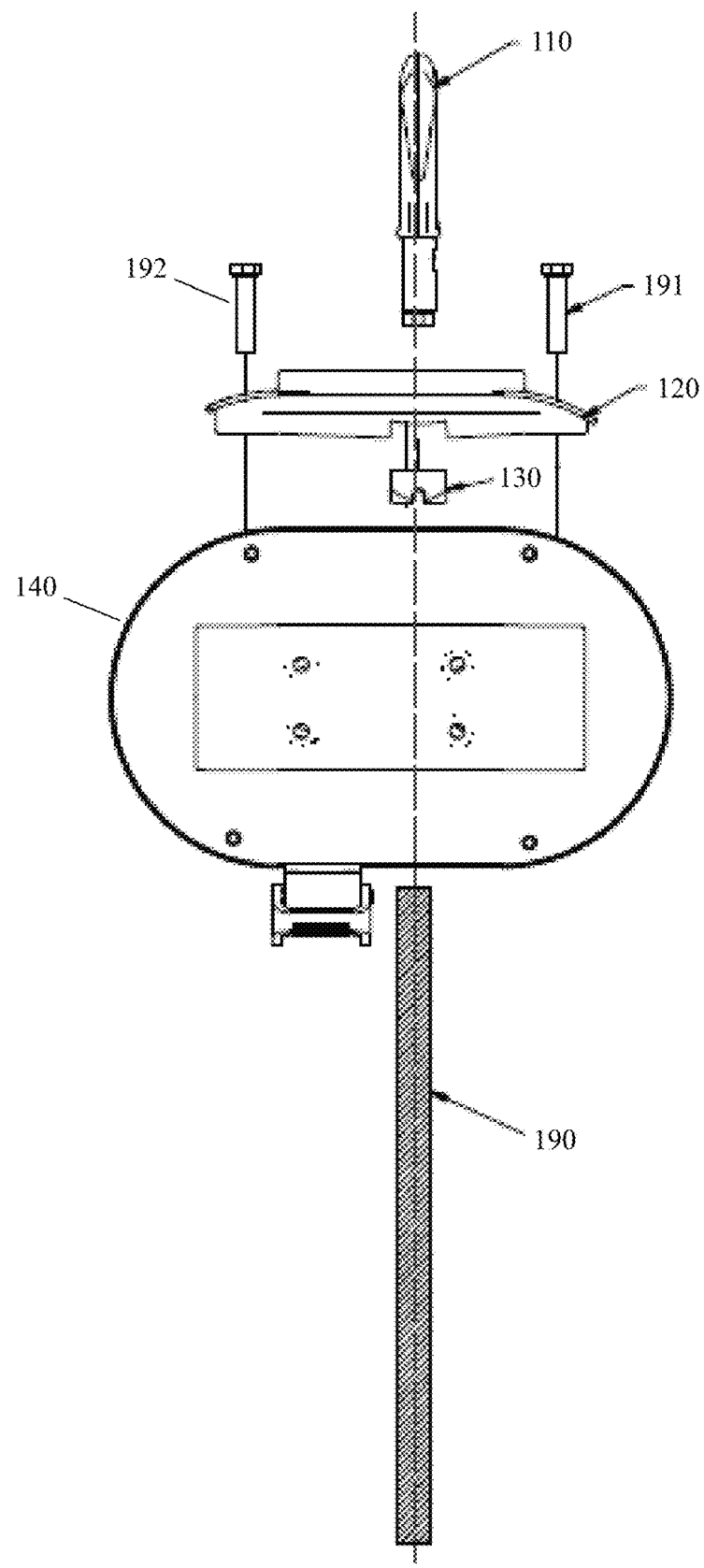
FIG. 4 is an exploded view showing a hook, a suspension, a nut for securing the hook to the suspension, a hoist housing, and bolts for securing the suspension to the hoist housing.

FIG. 4 is an exploded view showing a hook 110, a suspension 120 that connects the hook to the housing 140 of the hoist, a nut 130 for securing the hook to the suspension, and bolts 191 and 192 for securing the suspension to the hoist housing 140. (Note, the suspension may alternatively be integrally formed with the housing as a single unitary part).

Figure 5:
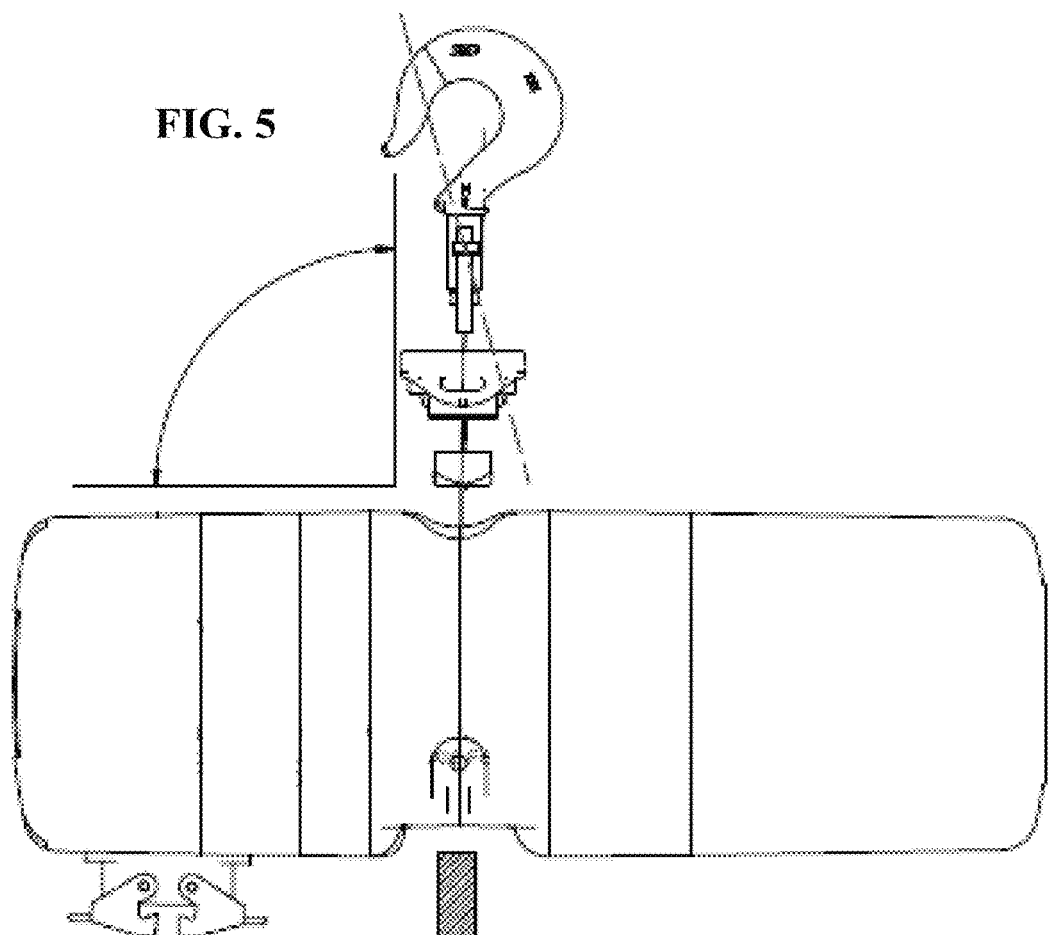
FIG. 5 illustrates issues related to misalignment of the loading of the chain, the suspension, and the hook, due to an off-axis center of gravity of the hoist relative to the hook, and due to the weight of an off-axis-positioned chain storage bag.
Figure 5A:
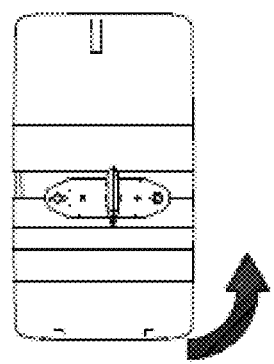
FIG. 5A illustrates the effect of torsional loads imposed on the hook of the arrangement of FIG. 5.

Ideally, the load imposed on the chain 190 and the load through the suspension 120 and to the hook 110 are in alignment. However, certain conditions affect this ideal transmission of load, and result in misalignment. For example, as seen in FIG. 5, the center of gravity of the hoist housing may be slightly off with respect to the axis of the hook, causing the hoist to sit at an angle when hanging freely. This misalignment angle may be exacerbated by the weight of chain stored at an off-axis-positioned storage bag, as shown in FIGS. 6-7. The chains used typically weigh about one pound per foot, and there may be 100 to 150 feet of chain stored in the storage bag, which may temporarily provide for a significant off-axis load. It was expected that as load was imposed on the chain due to lifting of an object, the load lines would become aligned, the hoist housing would quickly hang straight, and the weight reading would be accurate; however this did not occur. There may nonetheless still be an axis shift due to the eccentric loading imposed on the hoist housing by the chain storage bag, and there may be torsional loads imposed on the hook because it is fixed and not able to rotate, which is illustrated in FIGS. 5 and 5A.

Figure 61A:
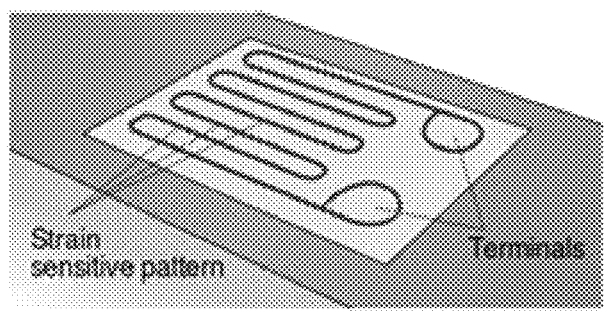
FIGS. 61A-61C illustrate a strain gauge and the effect of tensile forces and compressive forces on the changes to its resistance.
Figure 61B:
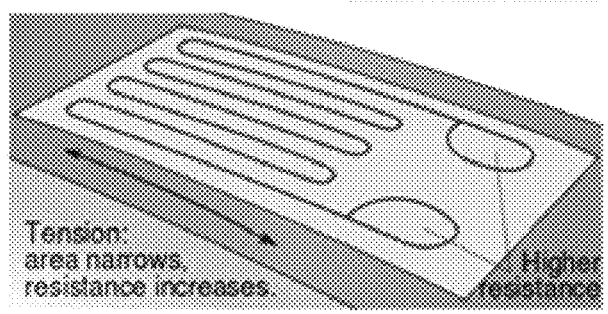
Figure 61C:
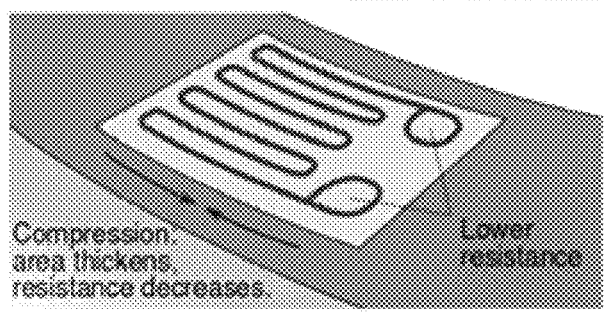

Several different embodiments underwent development to try to overcome these problems. One major challenge was to try to identify the best placement for the strain gauge. A strain gauge is typically a long electrically conductive strip formed into a ladder pattern, having long parallel sections connected by short transverse sections, as seen in FIG. 61A. When the long electrically conductive sections of the strain gauge experience tensile forces and undergo elongation, the area narrows and its electrical resistance increases (see FIG. 61B), which may be measured by a Wheatstone bridge circuit. The measured strain can be correlated to the load by knowing the dimensions of the object. When the long electrically conductive sections of the strain gauge experience compressive forces and contract, the area thickens and its electrical resistance decreases (see FIG. 61C).

Figure 10:
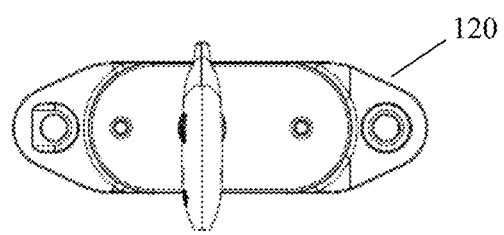
FIGS. 8-10 illustrate side, front, and top views of a first embodiment of a hook, a nut, a suspension, and a load cell strain gauge arrangement for a chain hoist, with the strain gauge(s) located on a shaft of the hook.
Figure 8:
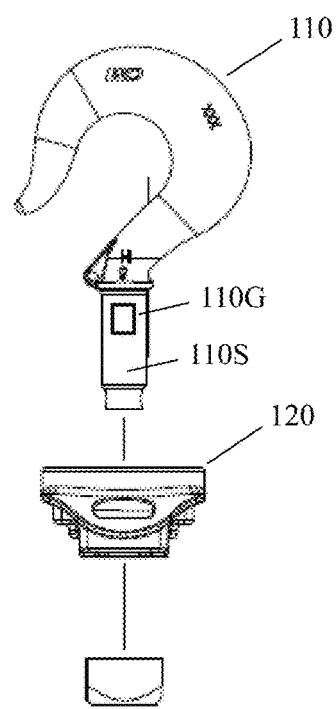
Figure 9:
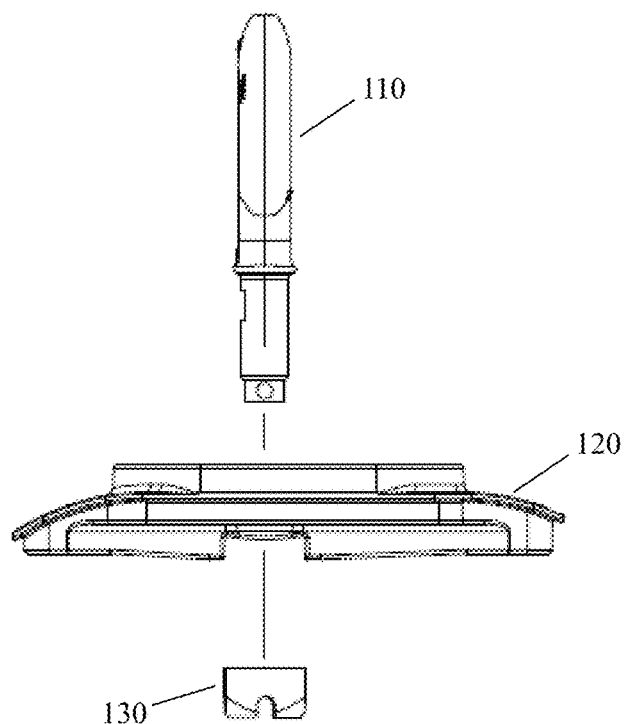

A first embodiment is shown within the side, front, and top views of FIGS. 8-10, in which one or more strain gauges 110G were positioned on a shaft 110S of the book 110. Loads imposed on the hook 110 would result in elongation of the shaft 110S, which elongation may be determined by the strain gauge(s) 110G positioned thereon. The results obtained were generally good, however a robust accounting for side and torsional loading was problematic. Any force that is not in line causes an error, and as noted above, the hoist tends to hang at an angle with no weight on it, thereby producing off axis forces, and when side loaded as described the hoist may hang at an angle of about 12-15 degrees, which applies a bending force to the hook stem (see FIG. 7). Depending on the rotational position of the hook 110 and the angle, forces can be added or subtracted, which may result in measurement errors in excess of 20-25% at the low end of hoist capacity. Once the hoist was loaded above 50% of its capacity, the forces were more in line and accuracy returned, however, the inconsistencies at lower load points was unacceptable high. Additionally, having the strain gauge 110G on the hook stem 110S required that the wire leads exit the stem at the bottom, thru the attachment nut, which could be a failure point for the wire, particularly with any hook rotation.

Figure 13:
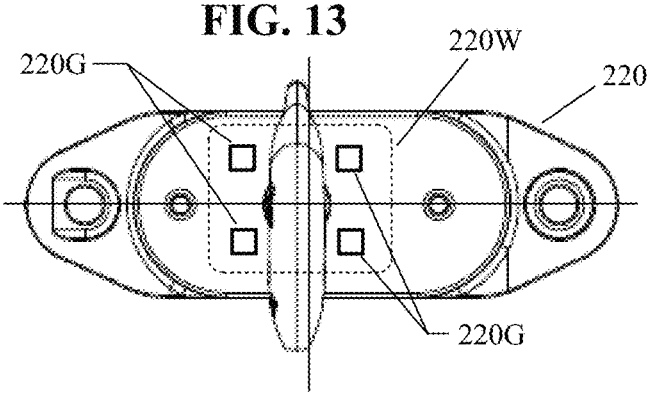
FIGS. 11-13 illustrate side, front, and top views of a second embodiment of a hook, a nut, a suspension, and a load cell strain gauge arrangement for a chain hoist, with the strain gauge(s) being located on the suspension.
Figure 11:
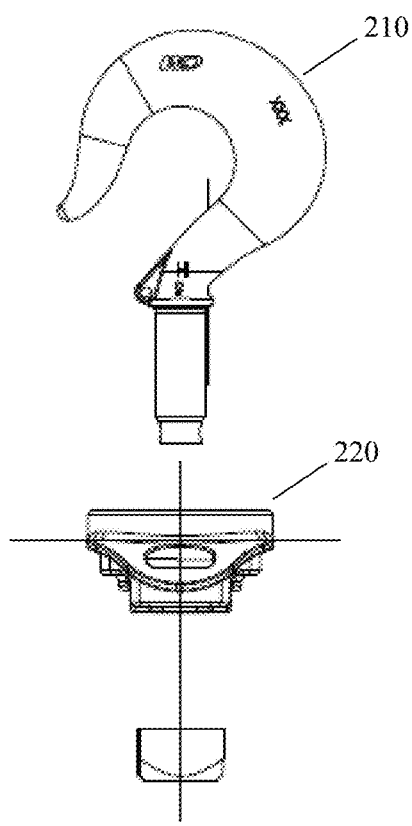
Figure 12:
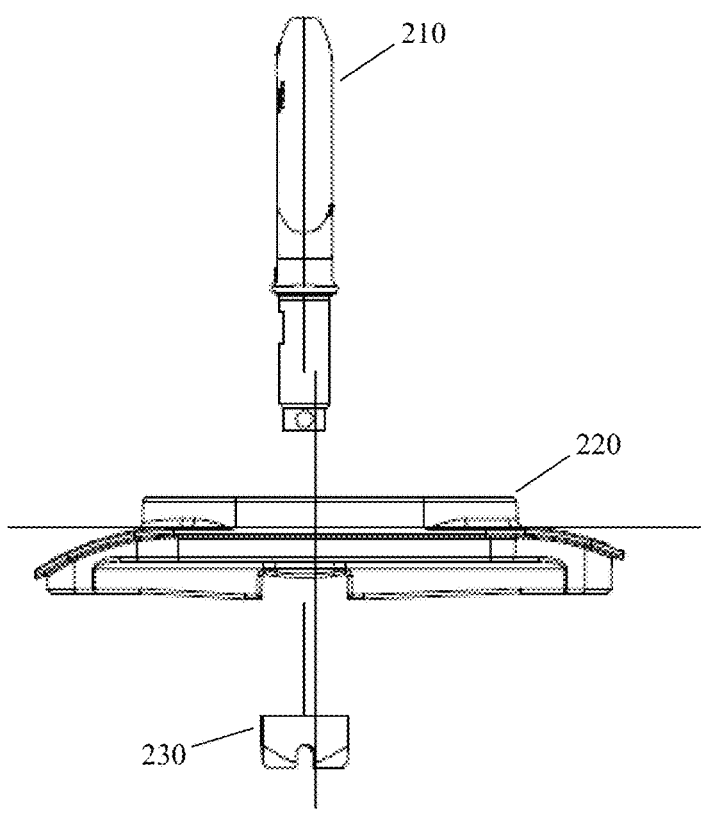

FIGS. 11-13 illustrate side, front, and top views of a second embodiment with one or more (e.g., four) strain gauge(s) 220G being positioned on the suspension 220, through which the hook 210 passes and is secured thereto by nut 230. This embodiment does not entail simply adding strain gauges to the suspension. In order for the strain gauges to be able to generate the proper output, material must be removed from the suspension to allow it to deflect sufficiently to measurably affect the strain gauge, which adversely affects the strength and safety factor of the suspension 220. Therefore there is a tradeoff between the strength and safety of the structural arrangement and the performance output of the assembly as a load cell. The wall thickness of the top of the suspension bounded by the dashed line 220W in FIG. 13 must be carefully controlled and coordinated with the load rating for the hoist.

Therefore, although the results obtained were good for some of the early tests, further attempts to modify these embodiments were made to obtain even better system performance, which are described hereinafter, and shown particularly with respect to FIGS. 17-27.

Figure 16:
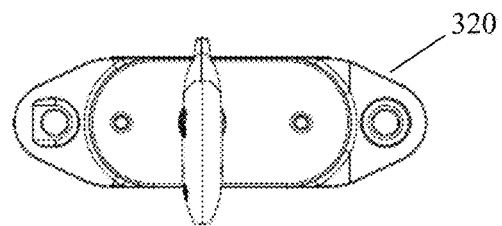
FIGS. 14-16 illustrate side, front, and top views of a third embodiment of a hook, a nut, a suspension, and a load cell strain gauge arrangement for a chain hoist, with the strain gauge being located on a rectangular bearing element positioned between the suspension and the nut that secures the hook to the suspension.
Figure 14:
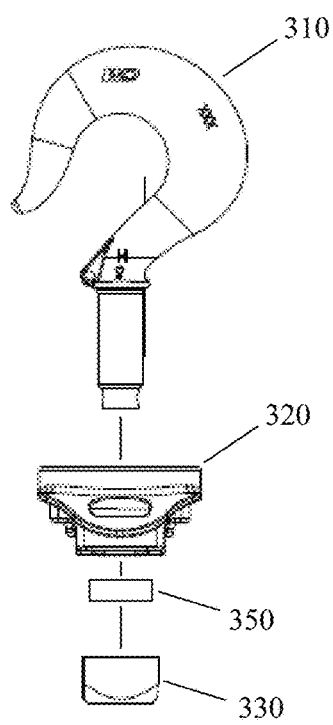
Figure 15:
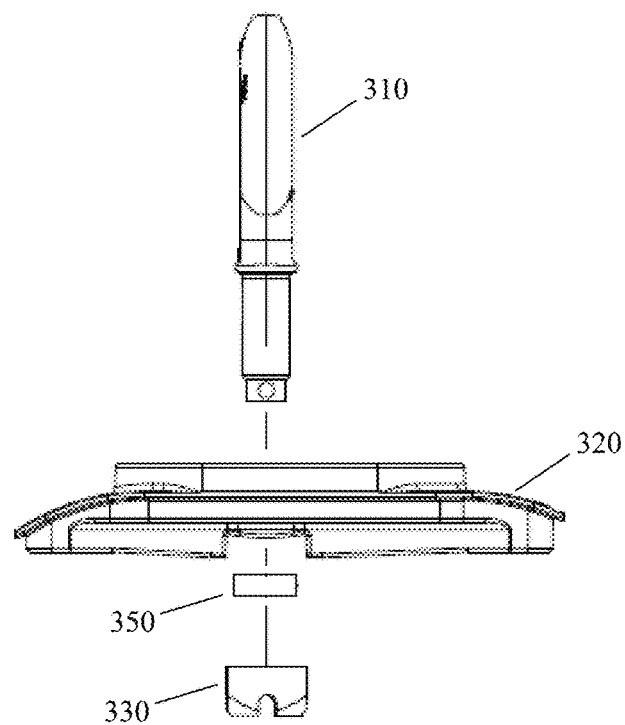
Figure 16A:
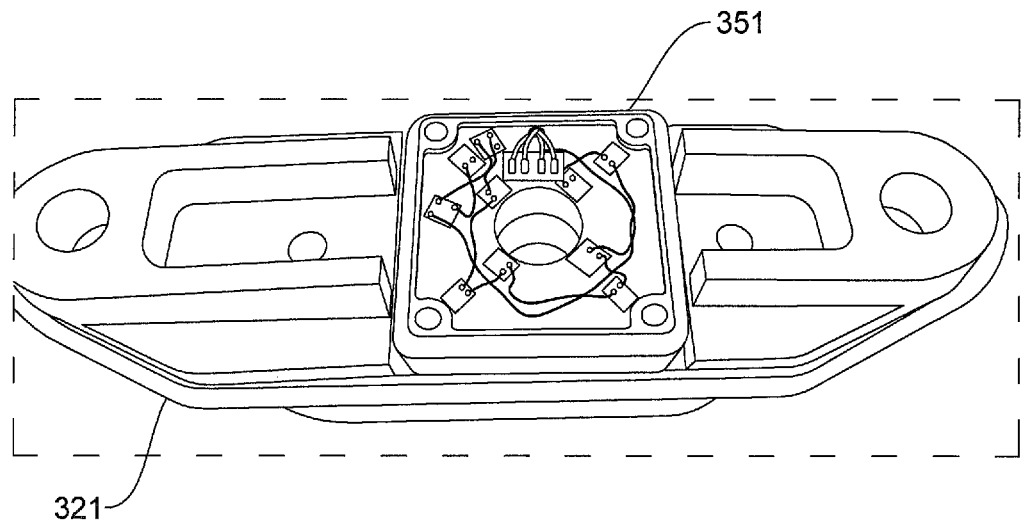
FIG. 16A is a photographic image of a prototype of the rectangular bearing and suspension shown in FIGS. 14-16.
Figure 16B:
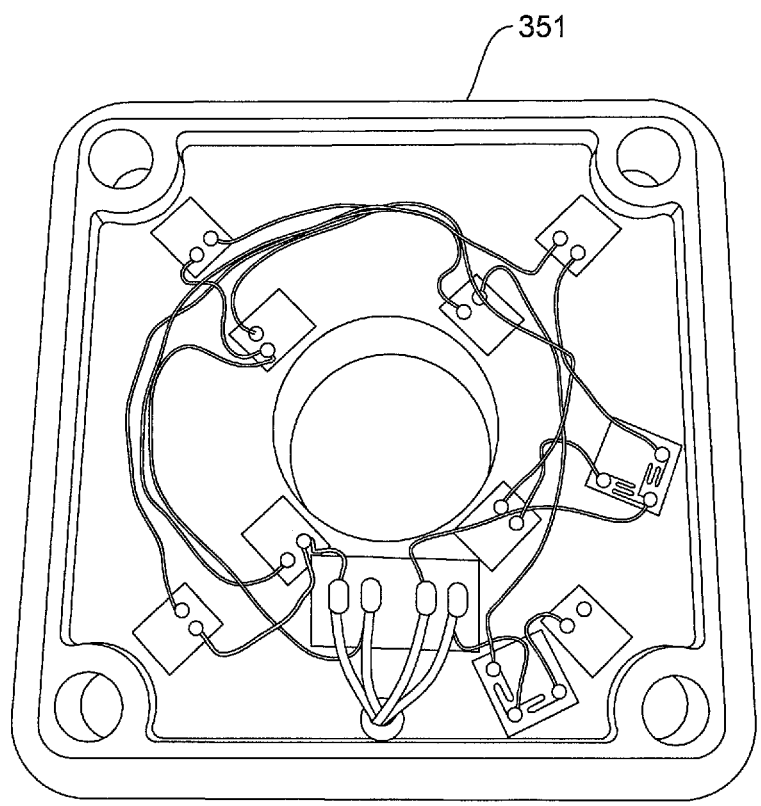
FIG. 16B is an enlarged photographic image of the rectangular bearing element shown in FIG. 16A.

FIGS. 14-16, illustrate side, front, and top views of another embodiment that was developed, in which a compression-type load cell bearing assembly 350 is positioned between the suspension 320 and the nut 330. Several different bearing elements for the load cell were developed. As seen in FIG. 16A and FIG. 16B, a square-shaped load cell bearing element 351 was first developed and utilized to try to capture the cross-sectional deflections experienced by the suspension in which it is housed, and which were imposed by a load placed on the hook 310. The square-shaped load cell bearing element 351 had four holes, one in each corner, which holes were used to bolt it to the corresponding suspension 321. However, the bolted connection tended to cause inaccuracy due to the transfer of force that prevented the metal element from naturally deforming by itself. A variation of this embodiment may include a similar square-shaped load cell bearing element (or a circular/cylindrical load cell bearing element—see FIGS. 16C-16D), but which only has a central hole through which the shaft may pass, as the only means for coupling of the bearing element with respect to the suspension. However, further improvements to this concept were developed.

FIGS. 17-21 illustrate various views of yet another embodiment that was developed, and which includes a load cell assembly 450 and corresponding suspension 420 with a hook 410, a nut 430, and an electronic circuitry package 462. As seen in FIG. 21, the load cell assembly 450 of this embodiment may include a cup member 451, a strain gauge sensor 452 and a PCB/electronics package, a second cup member 453, a bottom thrust washer 454, a thrust roller bearing 455, and a top thrust washer 456. The hardened steel cup member 451 forms a containment system designed to maintain the concentricity of the load cell components with respect to the suspension 420 while eliminating side loading and/or interference from the mechanical assembly. The cup member 451 may be formed of a disk having a concentric hole formed therein, and a concentric cylindrical side wall protruding up from the periphery of the disk. Additionally, the hardened surface of the washers of the load cell assembly 450 allow free transfer of forces from the suspension to the load cell. The thrust roller bearing 455 and thrust washers 454/456 allow free rotational movement (360 degrees) of the swivel hook 410.

For this embodiment, multiple gauges may be applied in a particular fashion and at particular locations to compensate for lateral, angular, and off axis loading.

In general, the strain gauge sensor 452 may be formed with one or more strain gauges that may be applied to one or more corresponding locations on a cylindrical side wall of a ring-shaped element.

In one embodiment, there may be only one strain gauge applied to the side wall of the ring-shaped element, but this arrangement may not account for off-axis loading, and the measured strain and corresponding load may be off significantly.

In another embodiment, there may be two strain gauges applied to the side wall of the ring shaped element, being equally spaced about the periphery (i.e., being 180 degrees apart), which may account for off-axis loading, but which may be in only one plane.

Many other possible strain gauge sensor arrangements may be similarly constructed (e.g., using different numbers of strain gauges at different locations).

Figure 23:
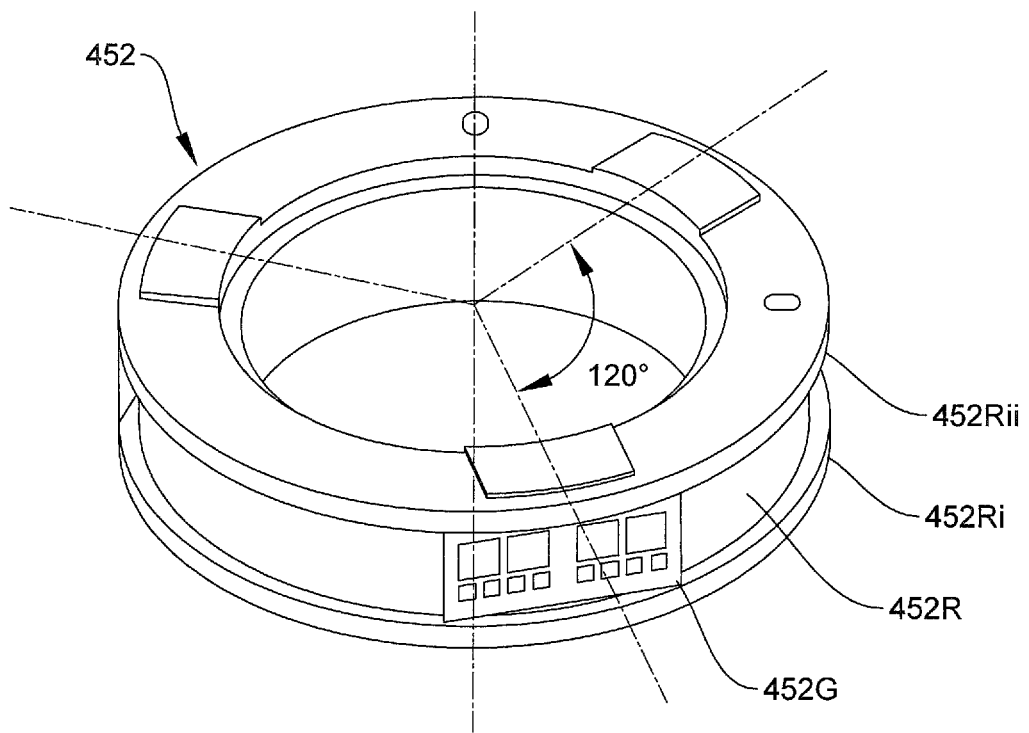
FIG. 23 is a perspective view of the strain gauge sensor used in the load cell assembly shown in FIGS. 17-20 and FIG. 22.

For example, in another embodiment, i.e., for the strain gauge sensor 452 shown in FIG. 23, there may be three strain gauges 452G applied to the side wall of the compression ring bearing element 452R, being equally spaced about the periphery (i.e., being 120 degrees apart), in which case a fixed resistor may be used to make up a fourth element of a Wheatstone bridge.

The compression ring bearing element 452R may have a lower overhanging lip 452Ri (i.e., a concentric cylinder having a slightly larger diameter) and an upper overhanging lip 452ii, each of which may protect the strain gauges 452G mounted to the side wall between the cylindrical lower and upper lips.

Figure 33:
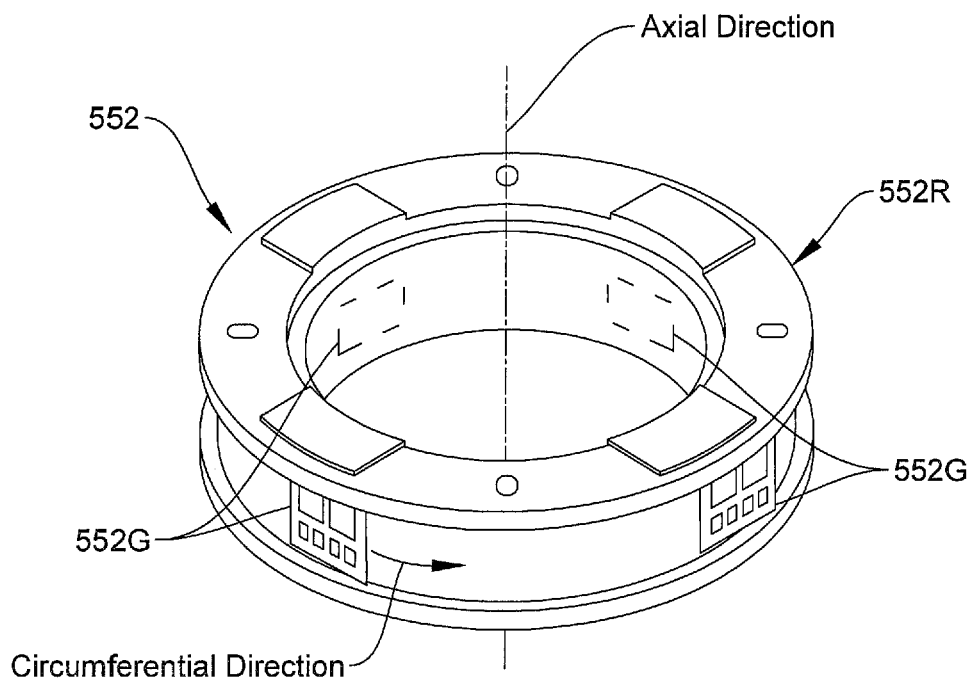
FIG. 33 shows the compression ring of FIG. 30 with four strain gauge rosettes applied thereto, being spaced 90 degrees apart, to form the strain gauge sensor shown in FIGS. 24-25.

In yet another embodiment, as shown in FIG. 33 for the strain gauge sensor 552, there may be four strain gauges 552G secured to the cylindrical side wall of the compression ring bearing element 552R, being spaced 90 degrees apart. Other numbers of strain gauges may be applied to the side wall of the compression ring bearing element in other embodiments.

Figure 34:
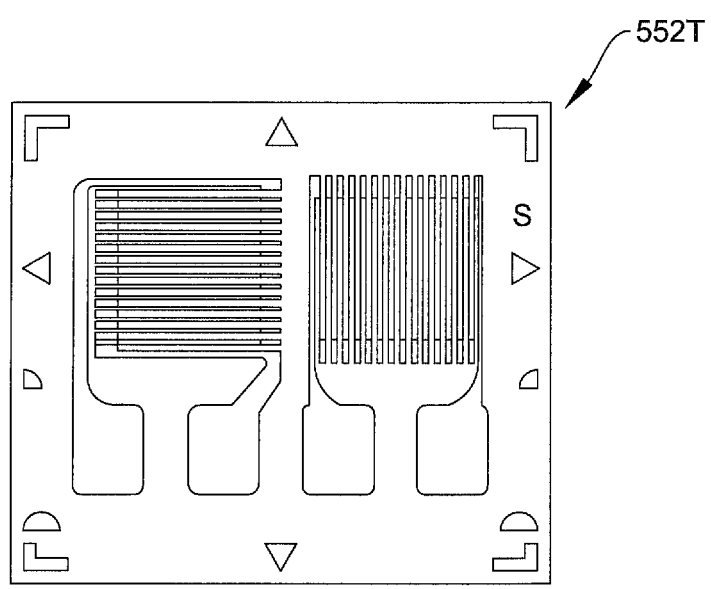
FIG. 34 is an enlarged detail view of the strain gauge rosette that is used on the strain gauge sensor shown in FIG. 33.

Each of the above described "strain gauge" positions utilized may actually have a strain gauge rosette secured thereto, which may be the same as or similar to the strain gage rosette 552T shown in FIG. 34. In general, a single strain gauge can only measure strain effectively in one direction. So a strain gauge rosette is an arrangement of two or more strain gauges that are positioned closely to measure strains along different directions of the component under evaluation, enabling more measurements to be taken, providing a more precise evaluation of strain on the surface being measured.

Figure 30:
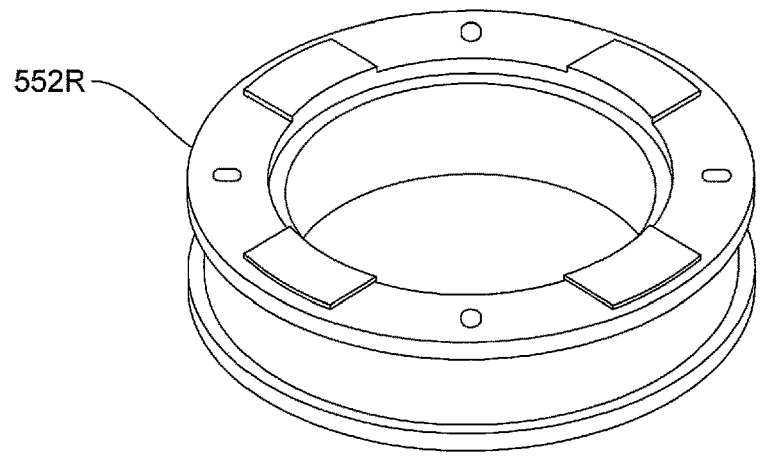
FIG. 30 is a perspective view of the compression ring bearing element used for the strain gauge sensor shown in FIGS. 24-25.
Figure 31:
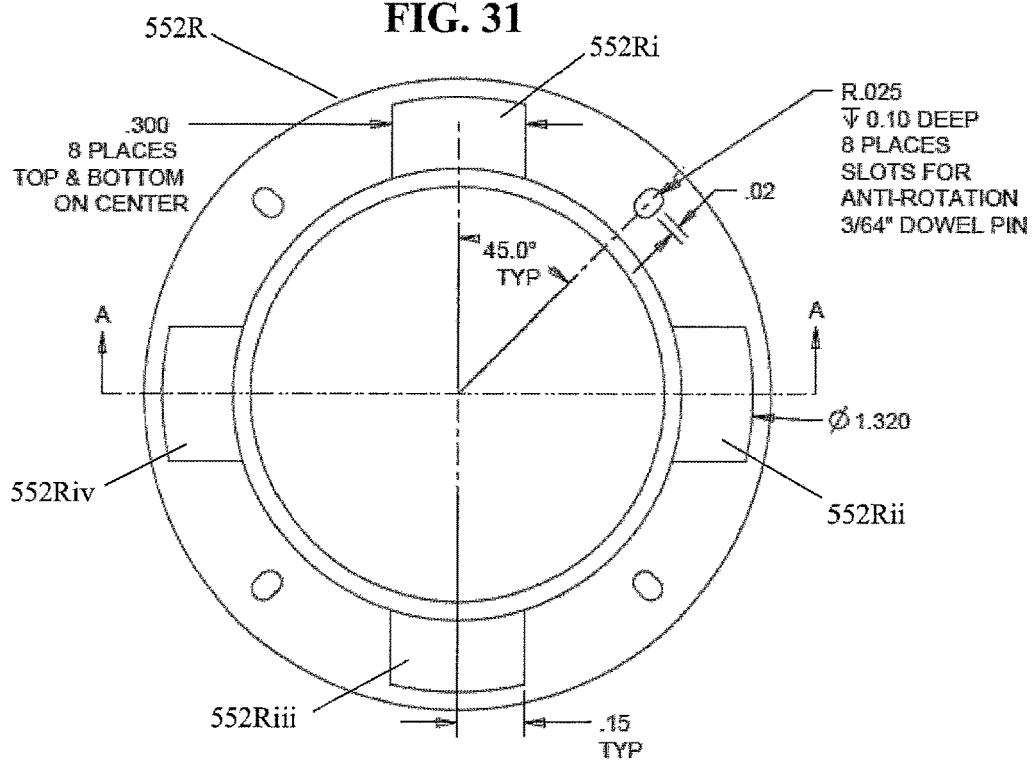
FIG. 31 is a top view of the compression ring bearing element shown in FIG. 30.
Figure 32:
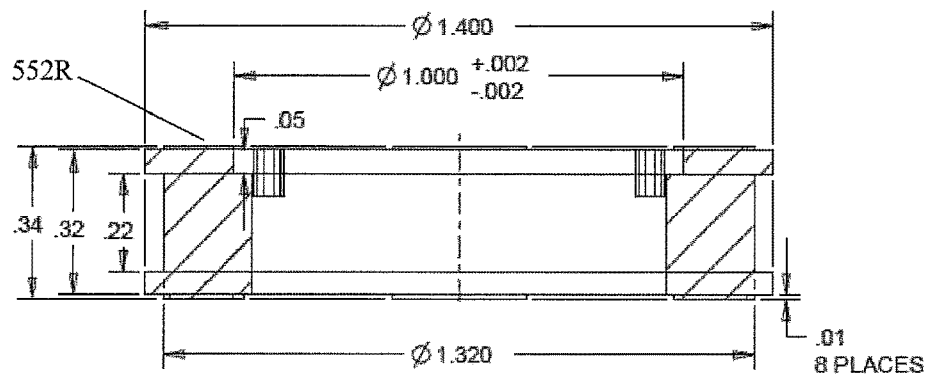
FIG. 32 is a cross-sectional view through the compression ring bearing element shown in FIG. 31.

Also, in one embodiment, each of the above-described compression ring bearing elements (e.g., element 552R shown in FIG. 30-32) may have a plurality of raised flat (or rounded/curved) contact pads (e.g., pads 552Bi, 552Bii, 552Biii, and 552Biv). These pads may serve to limit contact of the compression ring bearing element with the underside of the suspension to only occur at the pad locations (and where rounded, only at one location), which is where the strain gauge rosettes are attached, to assure that any loading of the compression ring bearing element only occurs at a strain gauge location.

Use of the strain gauge rosettes 552T as positioned on the compression ring bearing element 552R shown in FIG. 33 (and as also seen in FIG. 23 for compression ring bearing element 452R) provides measurement of the strain in both the axial direction and in the circumferential direction at each of the locations. If the compression ring bearing element experiences equal compression loading about its periphery, all strain gauges will contribute to the output signal equally. If the compression force is applied off axis, the strain gauges values will be different, as the compression force experienced will not be the same for each location. For the strain gauge rosettes 552T positioned on the compression ring bearing element 552R, the pairs of strain gauges will contribute to the signal for the appropriate strain put on them. If there is an off axis force imposed on one strain gauge, the measurements obtained at the opposing strain gauge of the pair will counter it, so the sum of forces on the strain gauge pairs is the same, if the load is purely axial or if it is off axis.

Figure 56:
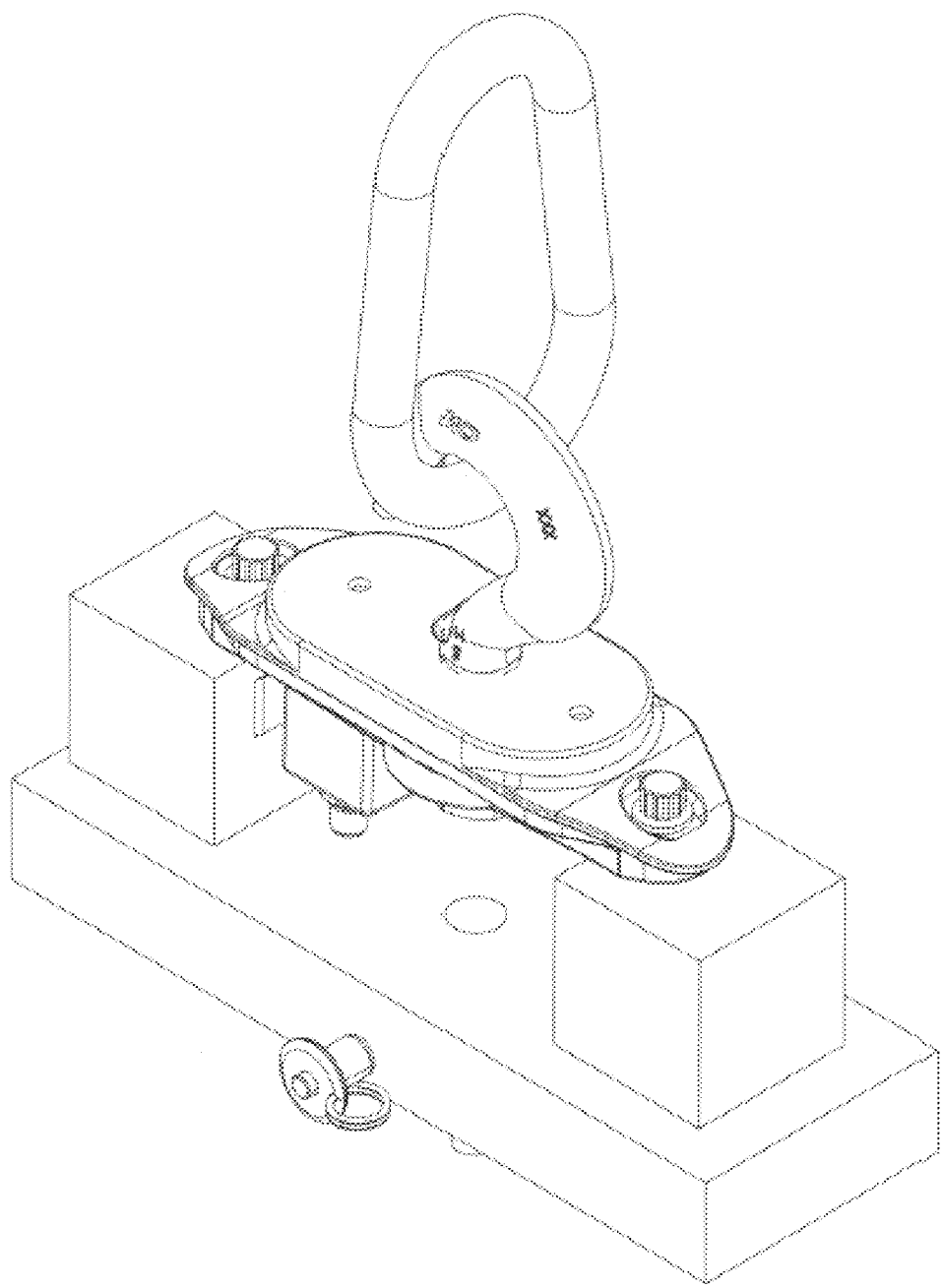
FIG. 56 is a perspective view of a first fixture used for calibration of the load cells disclosed herein, configured to apply a tension load to the hook.
Figure 57:
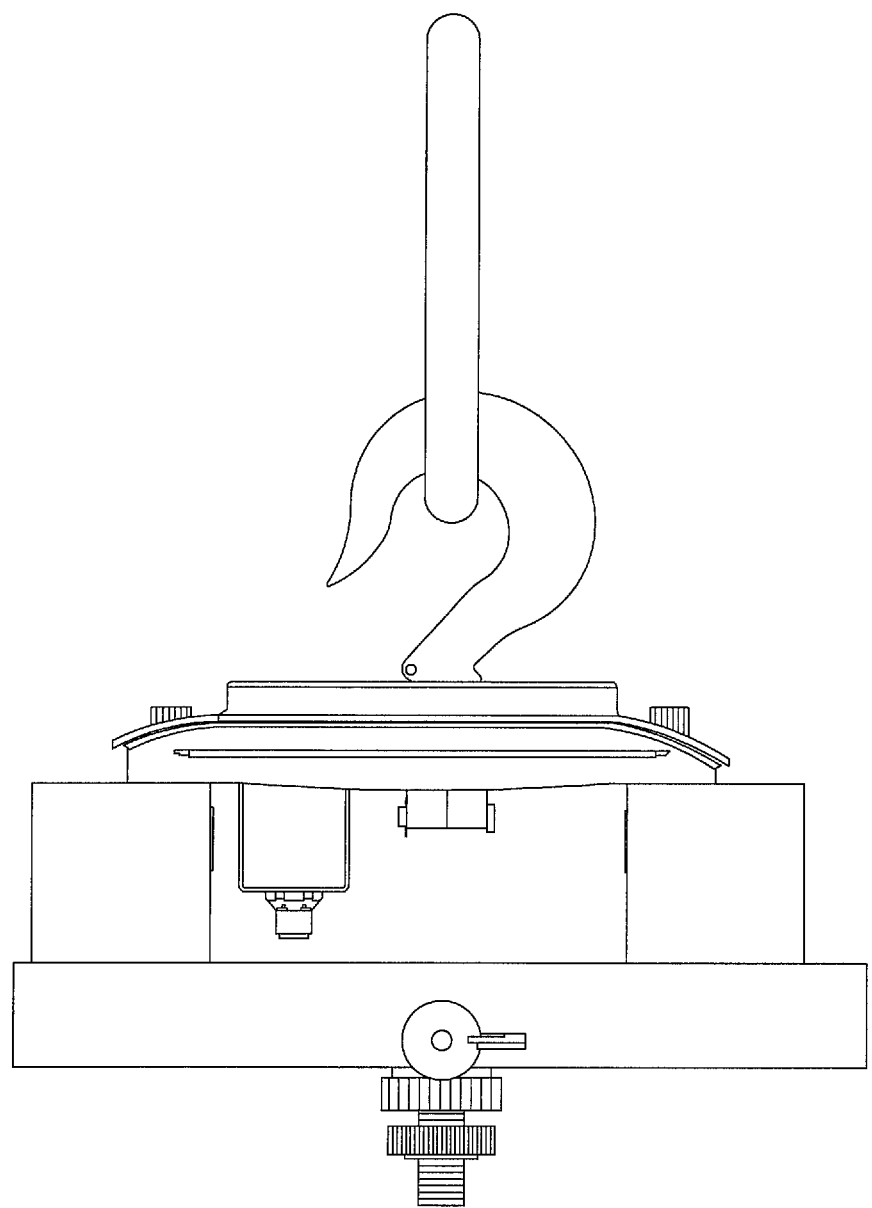
FIG. 57 is a front view of the calibration fixture of FIG. 56.
Figure 58:
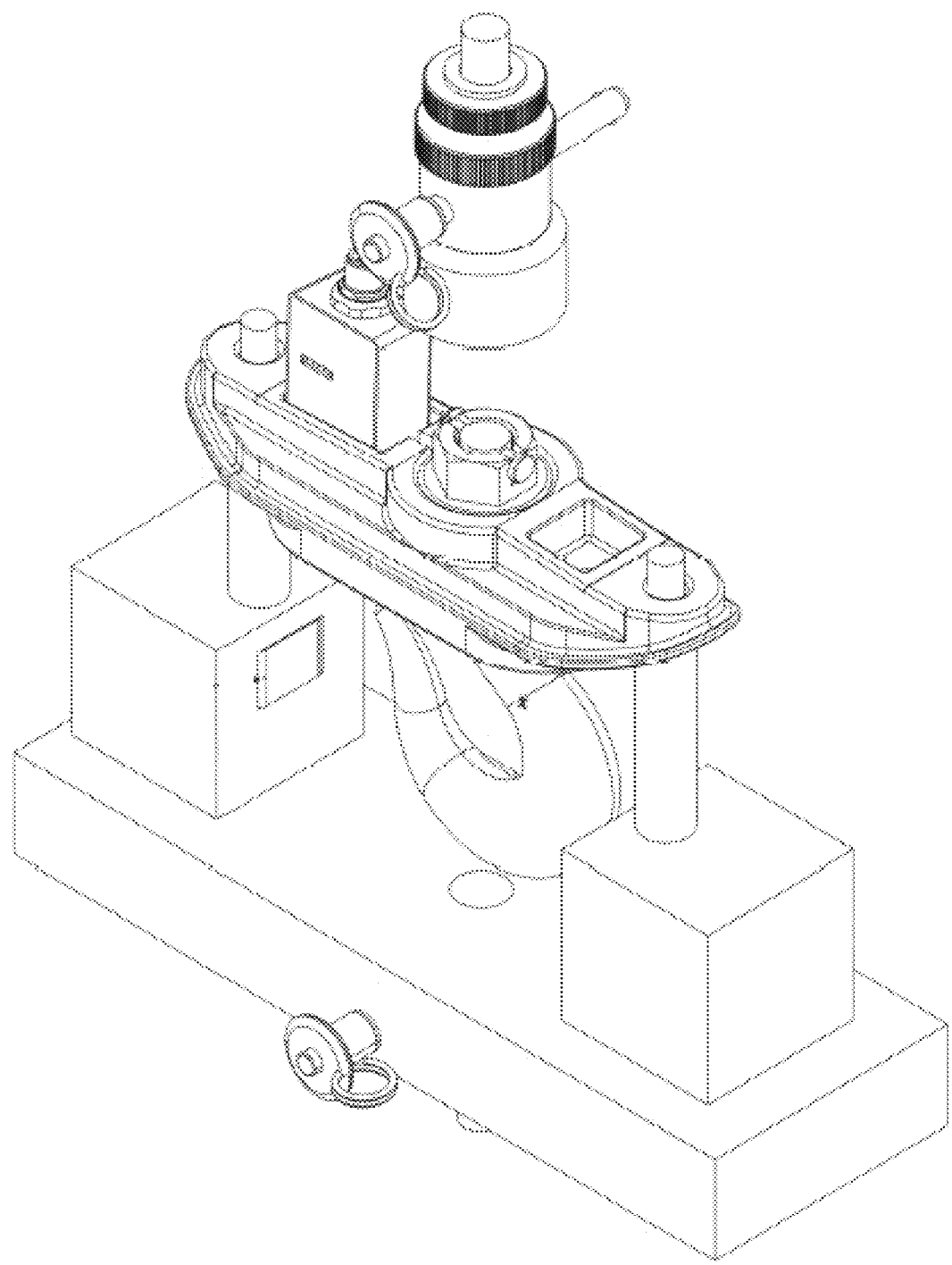
FIG. 58 is a perspective view of a second fixture used for calibration of the load cells disclosed herein, configured to apply a compression load to the nut.
Figure 59:
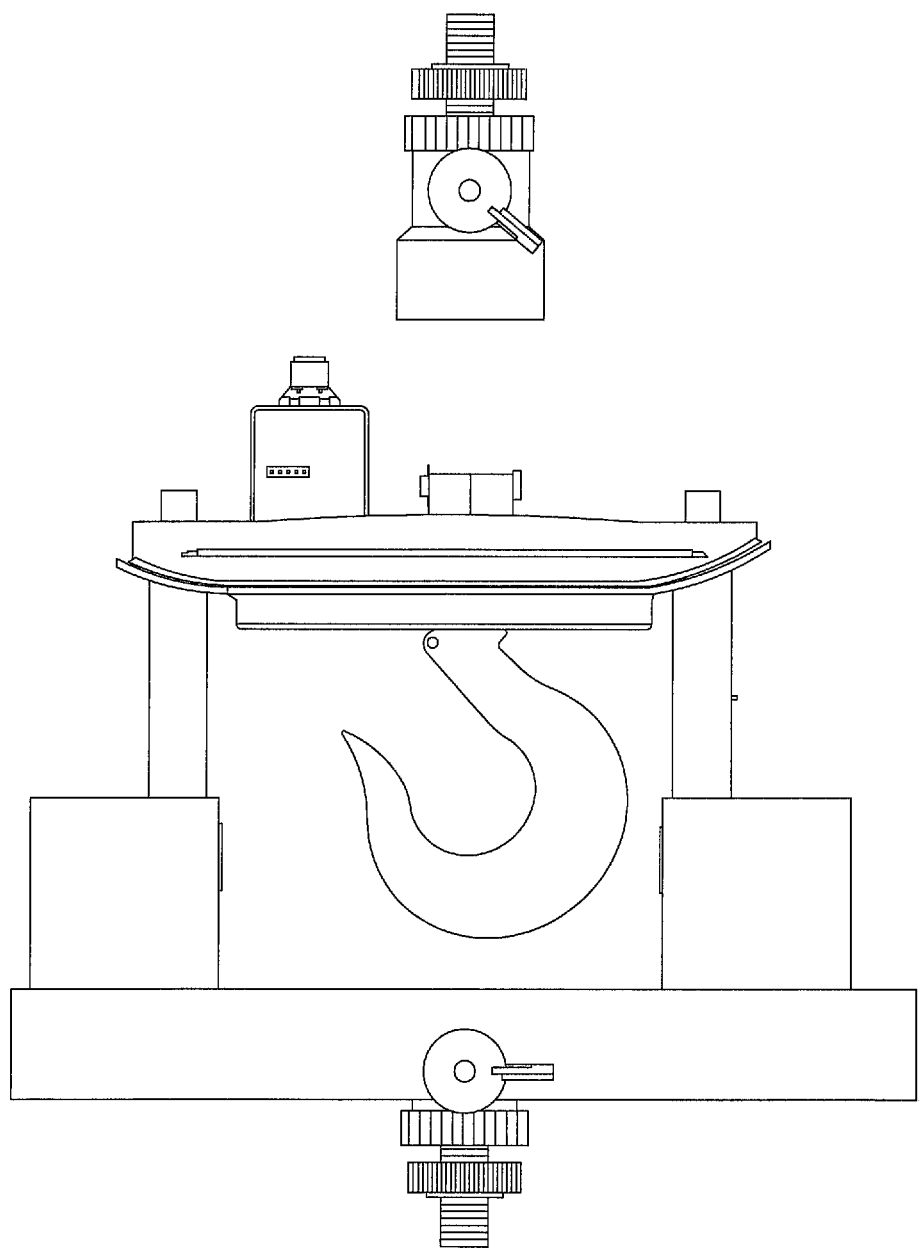
FIG. 59 is a front view of the calibration fixture of FIG. 58.
Figure 60:
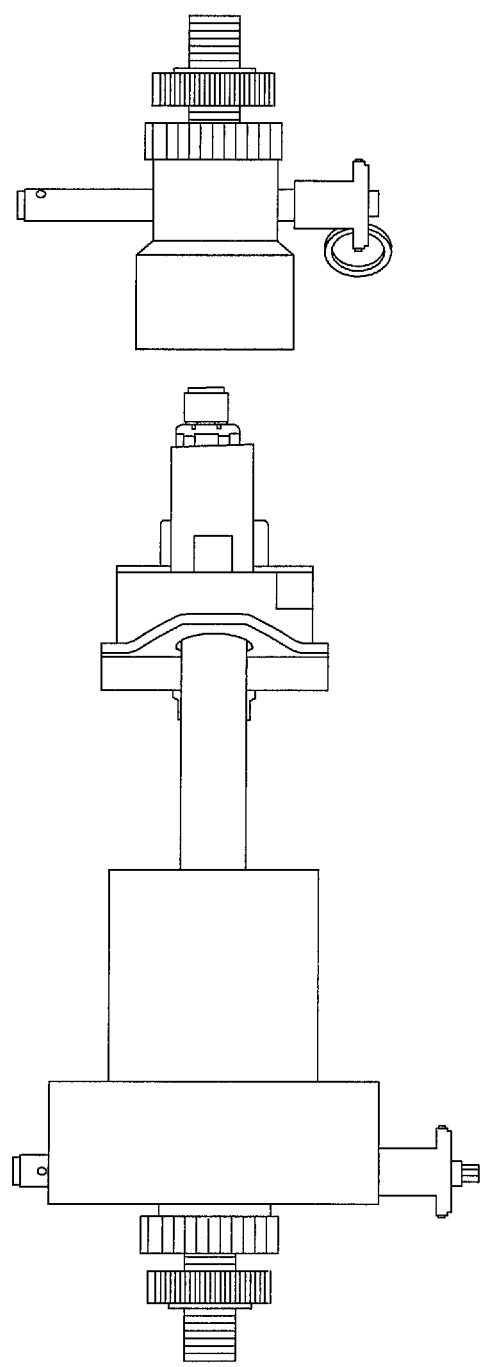
FIG. 60 is a side view of the calibration fixture of FIG. 58.

Ideally, the output of the four strain gauge rosettes would produce a perfectly linear line when graphing the output signal versus the imposed force. However, having this many strain gauges (eight in all—two on each rosette) working together results in a non-linear response, though it is repeatable for a given load. Therefore the electronics are calibrated according to an interpolation table that may use at least 8 to 10 data points, in which the measured values are adjusted according to a correction algorithm. The load cell calibration may begin by setting a zero point, and a max load that may be scaled to the desired weight range. The load cell may be incrementally loaded to known intermediate load points, and load cell weight measurements may be obtained. For example the load cell may be loaded with 1000 pounds, but measurement may read 975 pounds uncorrected. Once a table is constructed that reflects the nonlinear response, the program may adjust the load cell readings dynamically (e.g., interpolate) according to the correction table. For example, a load cell reading of 975 pounds would be corrected to read 1000 pounds. FIGS. 56-60 illustrate fixtures that were used to perform calibration of one or more load cell embodiments disclosed herein. In the fixture of FIGS. 56-57, the hook was hung on a support and the suspension was coupled to a cross-member using posts, and the cross-member was loaded to apply tension to the hook. In the fixture of FIGS. 58-60, the suspension was supported by a pair of rods, and a compression force was applied to the nut.

Figures 24, 25:
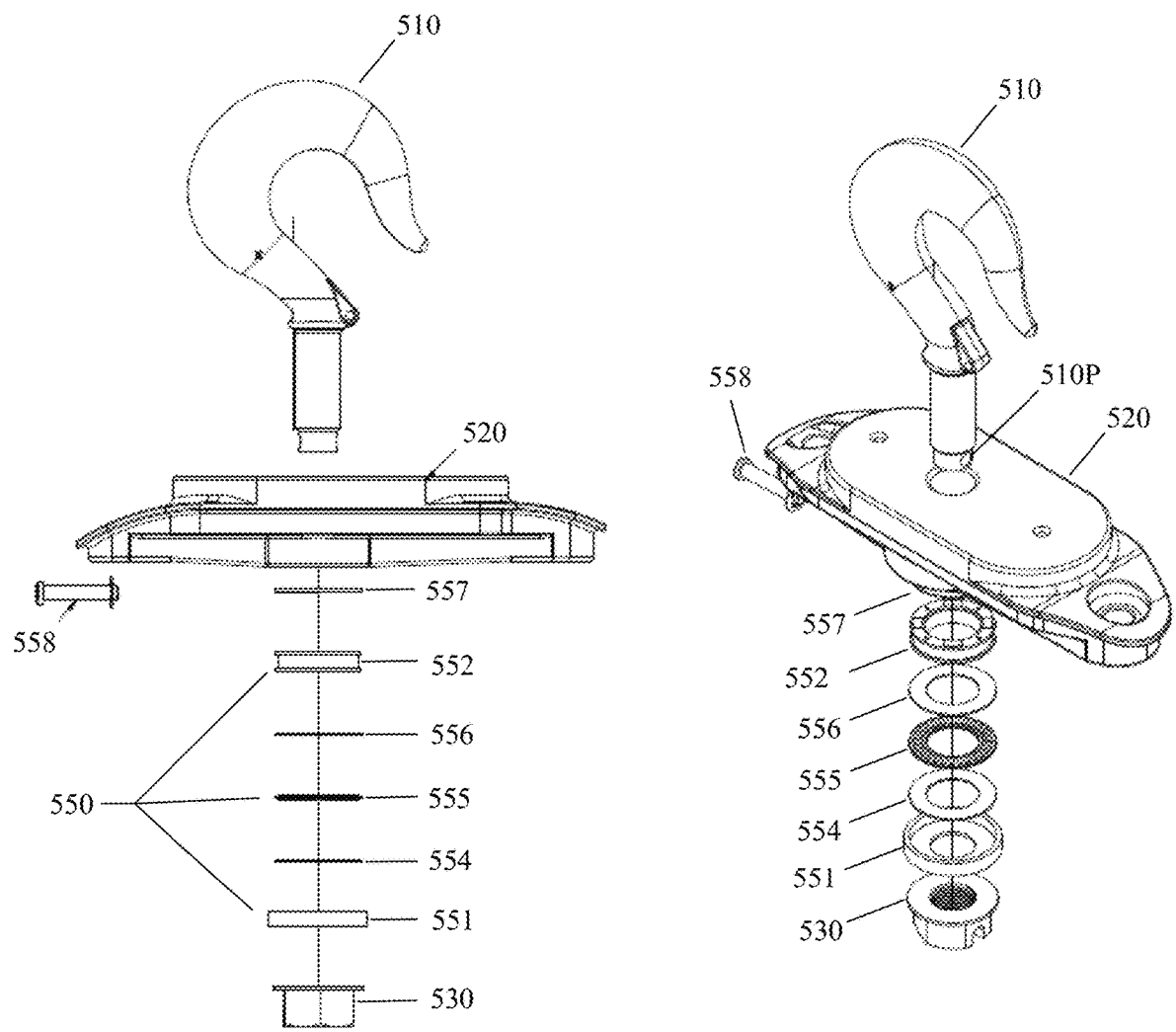
FIGS. 24-25 are an exploded side view and a perspective view illustrating another version of a hook, nut, suspension, and load cell assembly for a chain hoist.

FIGS. 24-25 illustrate front and perspective views of yet another embodiment that was developed, and which includes a load cell assembly 550 and a corresponding suspension 520, a hook 510, a nut 530, and electronic circuitry. The load cell assembly 550 may include a cup member 551, a thrust roller bearing 555, and a strain gauge sensor (i.e., one of the sensors described hereinabove—e.g., strain gauge sensor 552). The compression ring load cell assembly 550 may additionally include a bottom thrust washer 554 and a top thrust washer 556 being positioned on opposite sides of the thrust roller bearing 555. The thrust roller bearing 555 may be positioned between the strain gauge sensor 552 and the nut 530 to permit free rotation of the hook 510, without inaccuracy in the strain measurements and loads derived therefrom. In another embodiment, a hardened seat washer 557 may be positioned between the suspension 520 and the strain gauge sensor 552.

Figure 35A:
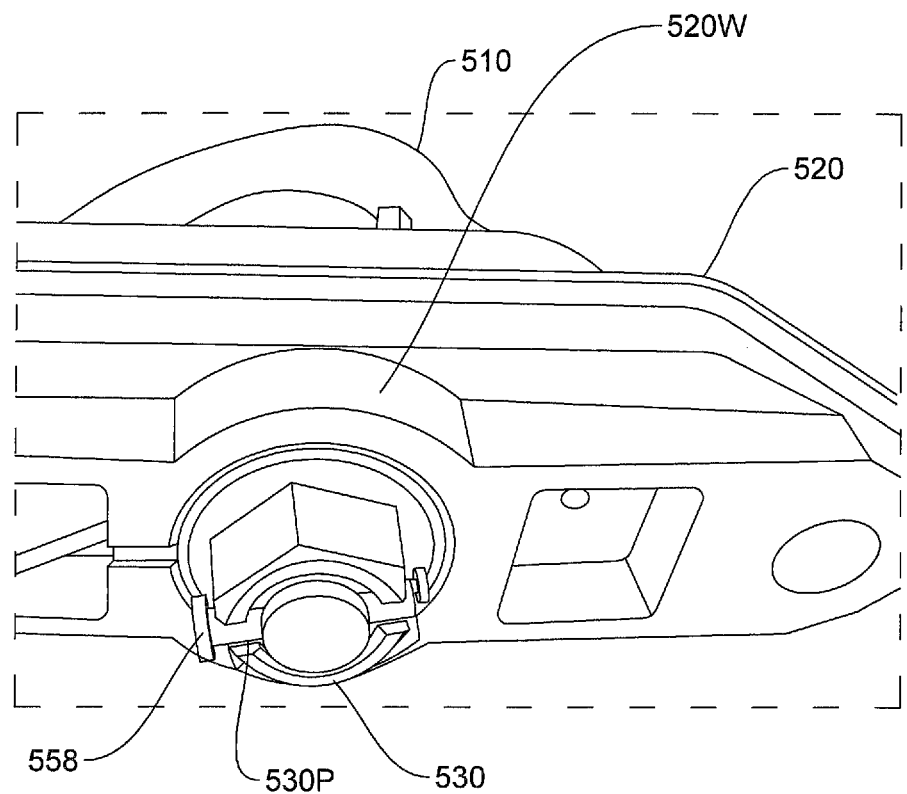
FIG. 35A is a photographic image of a prototype of a hook, suspension, nut, and compression ring load cell assembly formed substantially in accordance with the embodiment shown in FIGS. 24-25.

As illustrated in this embodiment, the strain gauge sensor 552 is reduced in size, as compared with one of the previously described strain gauge sensors, so that a corresponding curved wall 520W of the suspension 520 may completely surround the sensor to improve stability and alignment (see e.g., FIG. 35A). A comparison of the suspension 520 and the suspension 420 may be made by comparing the image in FIG. 35B with the one shown in FIG. 16D.

Testing of this embodiment verified that any variation in alignment affects the load cell readings. Early tests revealed that the thrust washers 554 and 556 and/or the thrust bearing 555 would tend to move around. Therefore, the cup member 551 was devised to be positioned above the nut 530 to contain the thrust washers 554 and 556 and the thrust bearing 555.

Figure 16C:
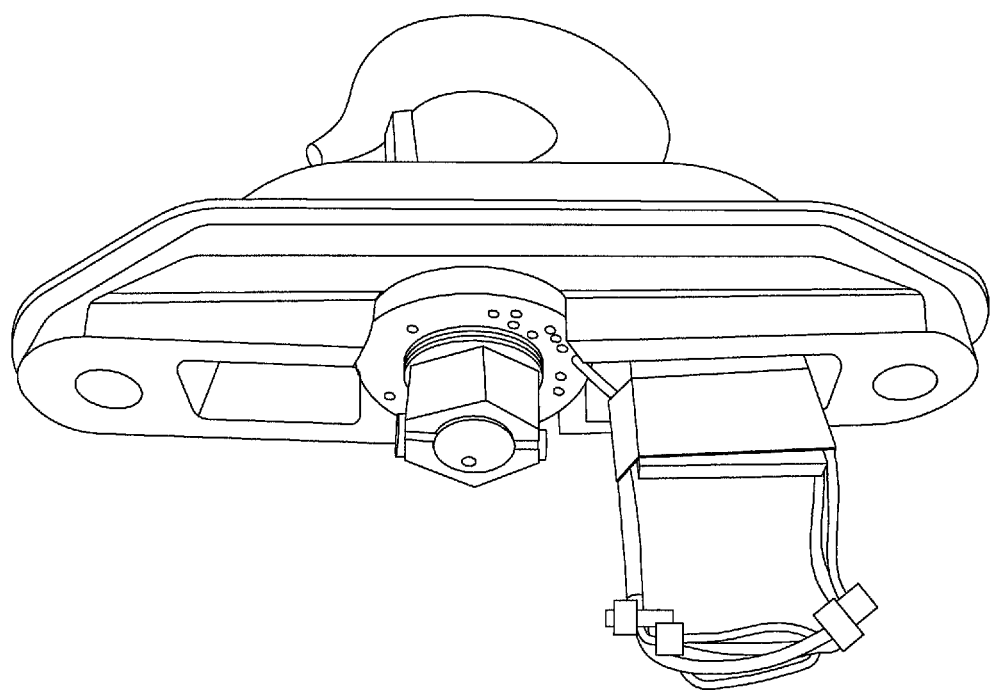
FIG. 16C is a photographic image of a prototype of a hook, nut, suspension, electronics package, and bearing element formed similar to the embodiment shown in FIGS. 16A-16B, but having a cylindrical bearing element and corresponding suspension, and shown with a PCB/electronics package.
Figure 16D:
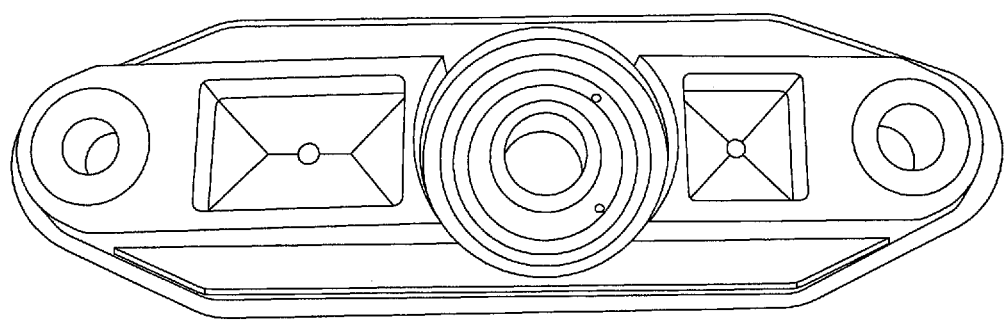
FIG. 16D is a photographic image of the bottom of the prototype suspension shown in FIG. 16C.
Figure 35B:
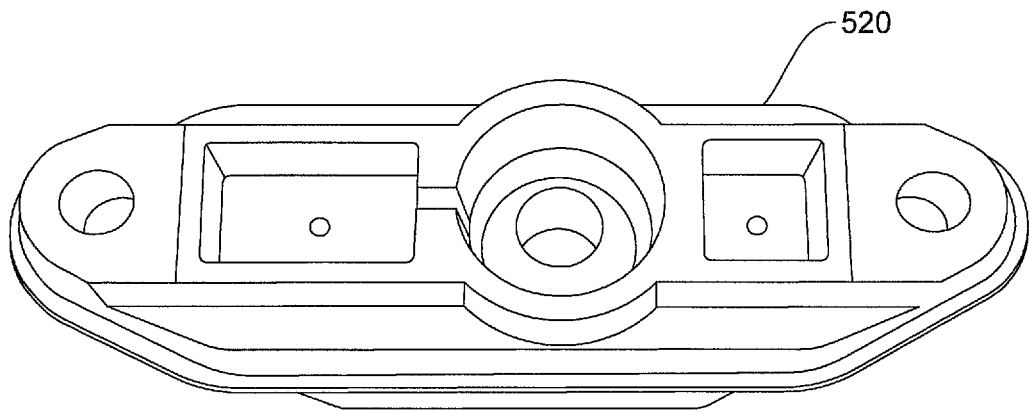
FIG. 35B is a photographic image of a bottom of the prototype suspension shown in FIG. 35A.

Moreover, although tests were initially performed using off-the-shelf suspensions that were reworked and had the sides open where the cup member 157 was positioned, as shown in FIG. 16C and FIG. 16D, in the embodiment shown in FIG. 35B that used a new suspension machined out of a solid block of metal to have a cylindrical wall 520W that completely surrounded the cup member, alignment was further improved and more linear repeatable results were obtained.

In assembling any of the embodiments described herein, a castellated nut (e.g., 430 or 530) may be threaded onto the hook and may preferably be threaded to leave a little play in the stack, so as not to preload the strain gauge sensor. During the assembly process it is therefore preferable to hand thread the nut to make it finger tight, and then back off the nut until one of the openings of the castellated nut (e.g., opening 530P in hook 530 as seen in FIG. 35A) aligns with the opening in the hook. A clevis pin 558 (or an ordinary cotter pin) may then be inserted through the aligned openings and be secured thereat, to prevent the nut from rotating relative to the hook and backing off, which may otherwise tend to occur since the hook may freely rotate 360 degrees.

Figure 17:
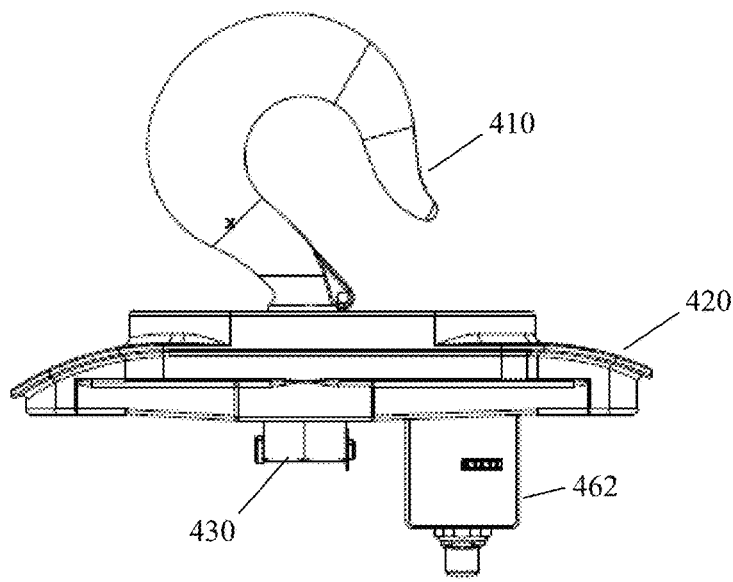
FIGS. 17-19 illustrate side, front, and bottom views of a fourth embodiment that includes a hook, a nut, a suspension, an electronics package, and a load cell arrangement for a chain hoist, with a hardened steel cup containment system designed to maintain the concentricity of the load cell within the suspension while eliminating side loading and/or interference from the mechanical assembly.
Figure 18:
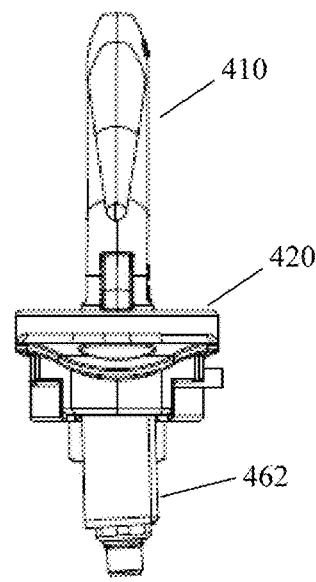
Figure 19:
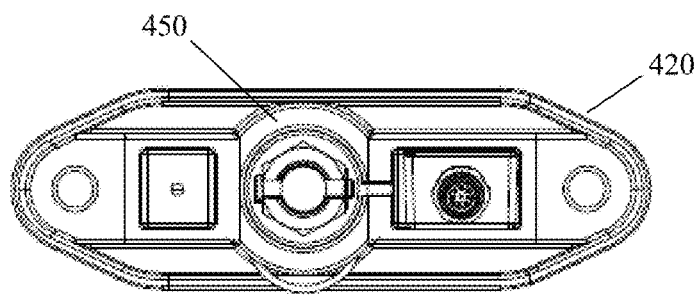
Figure 21A:
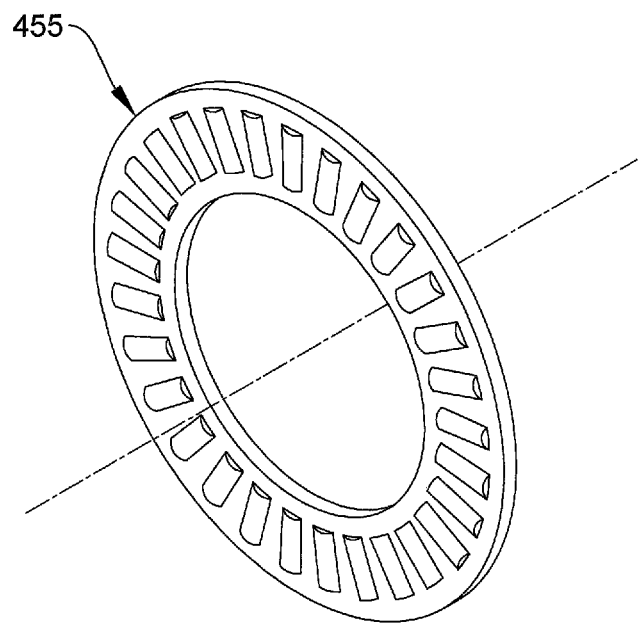
FIG. 21A is an enlarged detail view of the thrust roller bearing of the load cell assembly shown in FIG. 21.

The electronics shown in FIG. 16C were utilized for testing, however a production version of the electronics are packaged tighter to have a smaller envelope and occupy less space within the hoist housing (see e.g., the electronics package 462 shown in FIGS. 17-18 and 20). In addition the electronics are preferably protected against environmental moisture, by being encapsulated within potting material and received into a plastic box that may mount to the suspension. The electronics may utilize a 24 bit analog-to-digital (A/D) converter specifically configured for bridge type strain sensors, which may be continuously read by an onboard microcontroller that provides a digital weight value when requested by an external RS-485 host (also known as TIA-485(-A) or EIA-485, which is a standard defining the electrical characteristics of drivers and receivers for use in serial communications systems). There may also be a 4-20 mA variant for applications that require a current loop output such as PLC and variable frequency drive (VFD) equipment.

It is noted that although certain sizes may be cited for some of the embodiments shown herein, other sizes may be used, particularly for different sized hoists having different load capacities.

Figure 40:
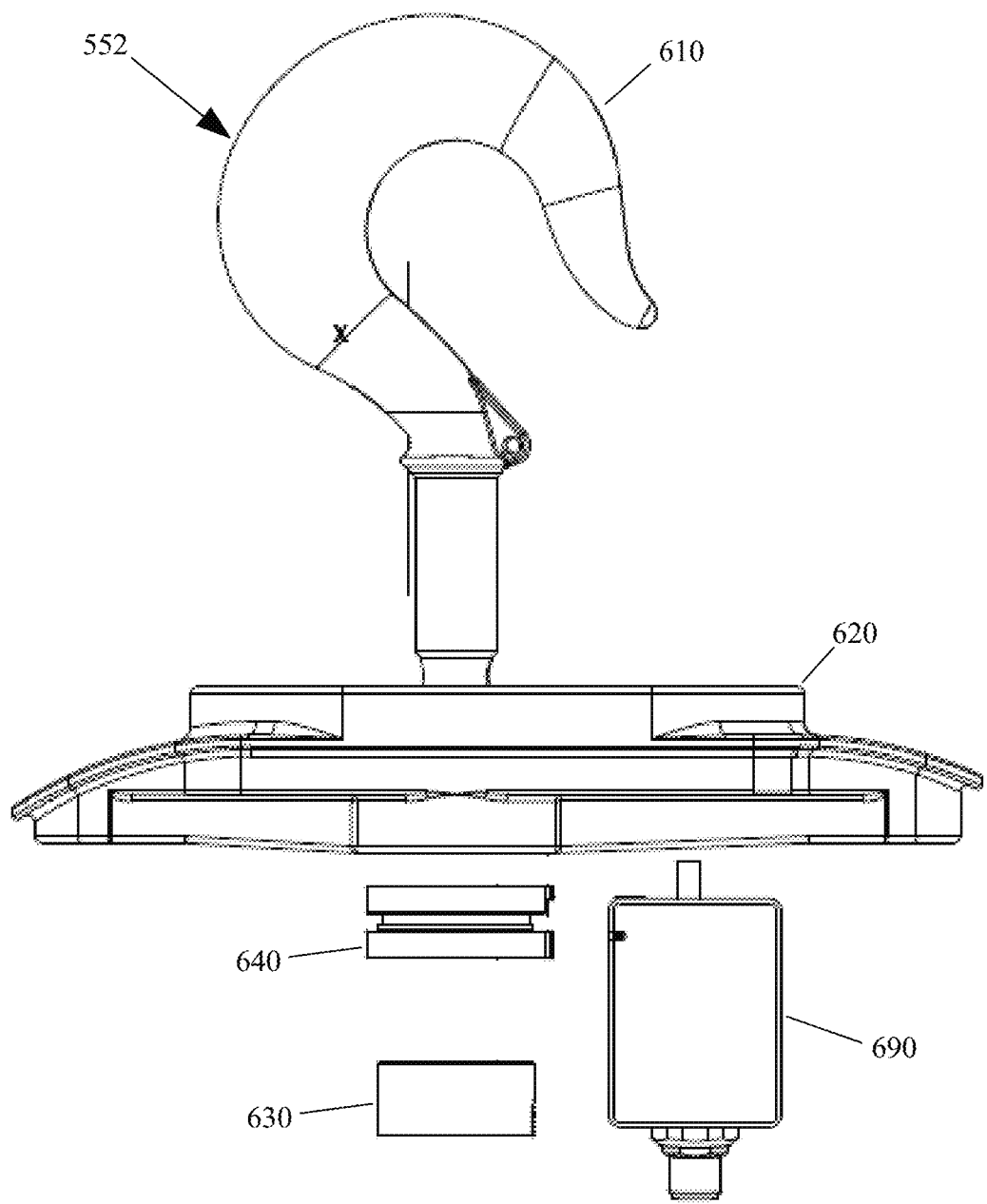
FIG. 40 is an exploded side view of the hook, nut, suspension, load cell assembly, and electronic circuitry package of FIG. 36.
Figure 41:
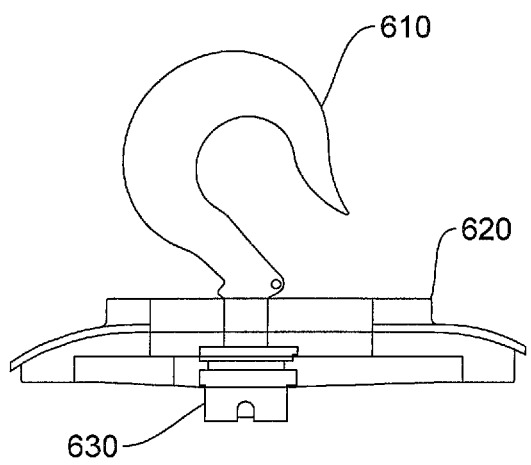
FIG. 41 is the side view of FIG. 37, but shown without the electronics package and shown as a transparent view.
Figure 42:
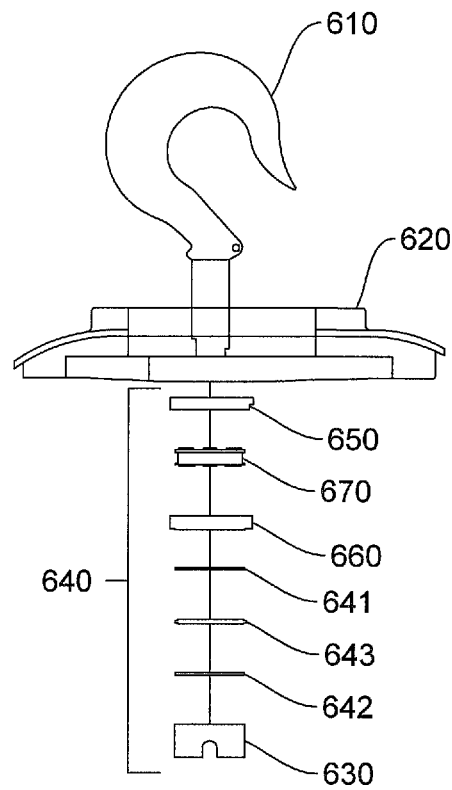
FIG. 42 is an exploded view showing the component parts of the load cell assembly and the nut prior to assembly and installation into the suspension, as shown in FIG. 41.
Figure 43:
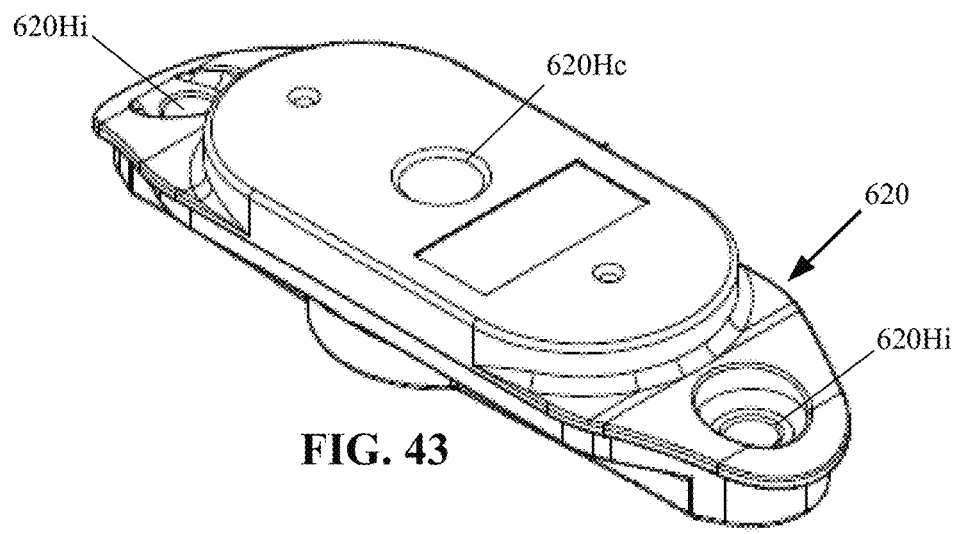
FIG. 43 is a perspective view of the suspension of FIG. 36.
Figure 45:
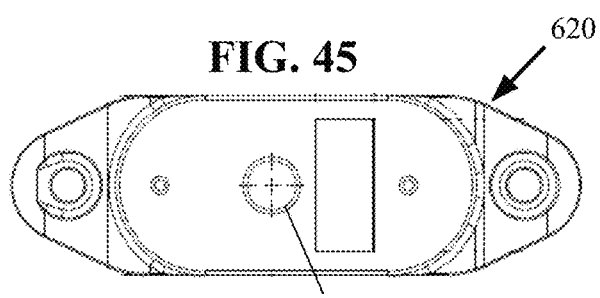
FIG. 45 is a top view of the suspension of FIG. 43.
Figure 47:
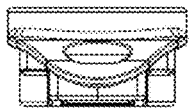
FIG. 47 is a first end view of the suspension of FIG. 43.
Figure 44:
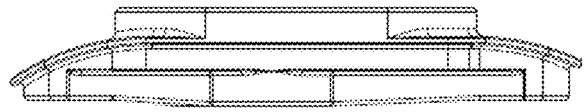
FIG. 44 is a front view of the suspension of FIG. 43.
Figure 48:
FIG. 48 is a second end view of the suspension of FIG. 43.
Figure 46:
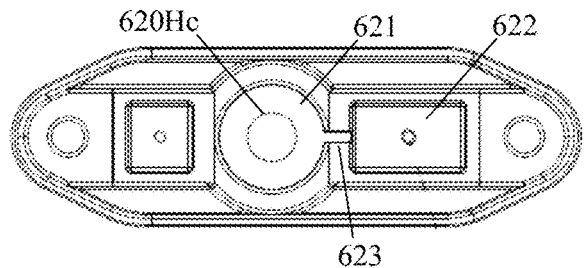
FIG. 46 is a bottom view of the suspension of FIG. 43.

However, in yet another embodiment shown in FIGS. 36-54D, the tolerances and clearance amounts of many of the mating parts are critical in order to achieve accurate repeatable results. The assembled embodiment shown in the views of FIGS. 36-39 and in the exploded view of FIG. 40 exhibits even better results than the hereinabove described embodiments, and includes a load cell assembly 640 and a corresponding suspension 620, a hook 610, a custom nut 630, and an electronic circuitry package 690. As seen in the exploded view of FIG. 42, the load cell assembly 640 has a top thrust washer 641, a bottom thrust washer 642, and a thrust roller bearing 643, with the thrust washers being positioned on opposite sides of the thrust roller bearing 661, and with the washers and bearing being housed in a bottom cup member 660. The thrust roller bearing 661 may have a plurality of rollers oriented radially, similar to the thrust roller bearing 452 shown in FIG. 21A. The load cell assembly 640 also includes a top cup member 650 that may receive therein the strain gauge sensor 670 in the particular manner discussed hereinafter.

The suspension 620 is shown in detail in FIGS. 43-48. As seen therein, the suspension 620 may have a pair of through holes 620Hi and 620Hii for mounting the suspension to the housing of the hoist, and a central hole 620Hc for receiving the shaft of the hook therethrough. The bottom of the suspension 620 may have a cylindrical recess 621 that may be formed to be concentric with the central hole 620Hc, and which may receive the load cell assembly 640 therein. The bottom of the suspension 620 may also have a recess 622 that may be configured to receive the electronic circuitry package 690 therein. A recess 623 may connect the cylindrical recess 621 with the recess 622.

The top cup 650 is shown in detail in FIGS. 54A-54D, and may include a cylindrical disk 651 having a particular outer diameter, and a concentric cylindrical opening 652. Extending laterally away from the outer periphery of the cylindrical disk 651 is a cylindrical wall 653, which wall may have an opening 653N that may extend part-way to the adjacent surface of the cylindrical disk 651. The opening 653N may have a width that may be the same as a width used for the recess 623 of the suspension 620. The opening 653N in the cylindrical wall 653 may transition into a rectangular protrusion 653P that may be configured to be received in the recess 623 of the suspension 620 in a clearance fit. The rectangular protrusion 653P may be formed by the cylindrical disk 651 extending outwardly beyond the opening 653N at that location, as seen in FIG. 54B. The rectangular protrusion 653P of the top cup 650 and the recess 623 of the suspension 620 may therefore act as a key and keyway to prevent rotation of the top cup once received within the cylindrical recess 621 of the suspension 620. The top cup 650 may also have a cylindrical wall 654 extending laterally away from the inner periphery of the cylindrical disk 651 at the cylindrical opening 652. The top cup 650 may also have a pair of anti-rotation pins 655i and 655ii that may be positioned as shown in FIG. 54B, between the cylindrical wall 653 and the cylindrical wall 654. The anti-rotation pins 655i and 655ii may be utilized with respect to the compression ring bearing element 670R of the strain gauge sensor 670.

Figure 52A:
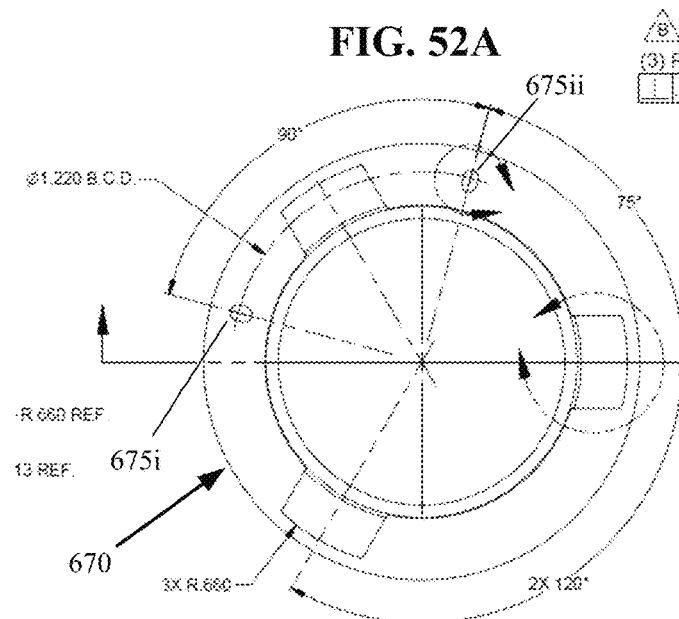
FIG. 52A is a front view of the compression ring used in the load cell assembly of FIG. 36.
Figure 52B:
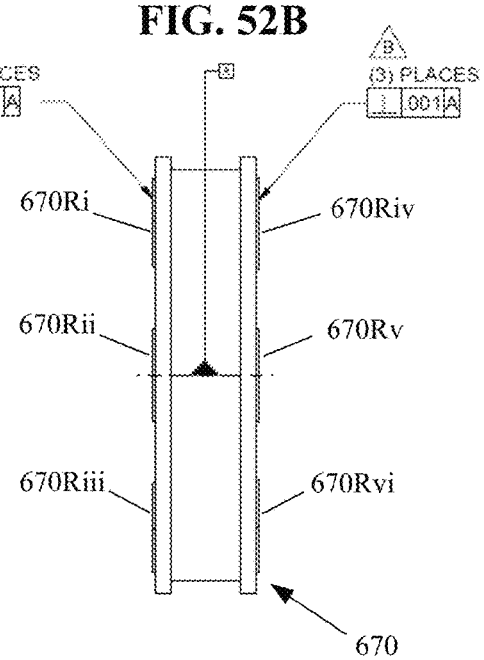
FIG. 52B is a side view of the compression ring of FIG. 52A.
Figure 52D:
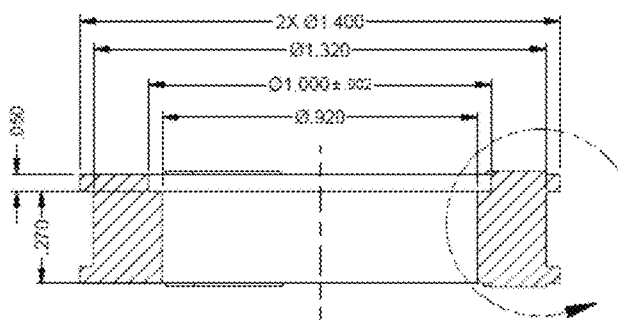
FIG. 52D is a cross-sectional view through the compression ring of FIG. 52A.
Figure 52C:
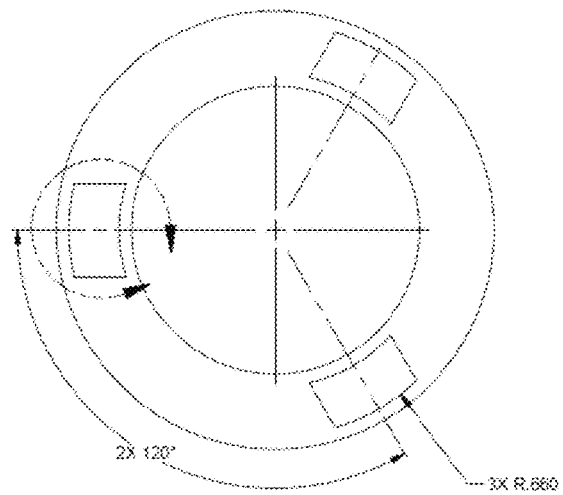
FIG. 52C is a rear view of the compression ring of FIG. 52A.
Figure 55:
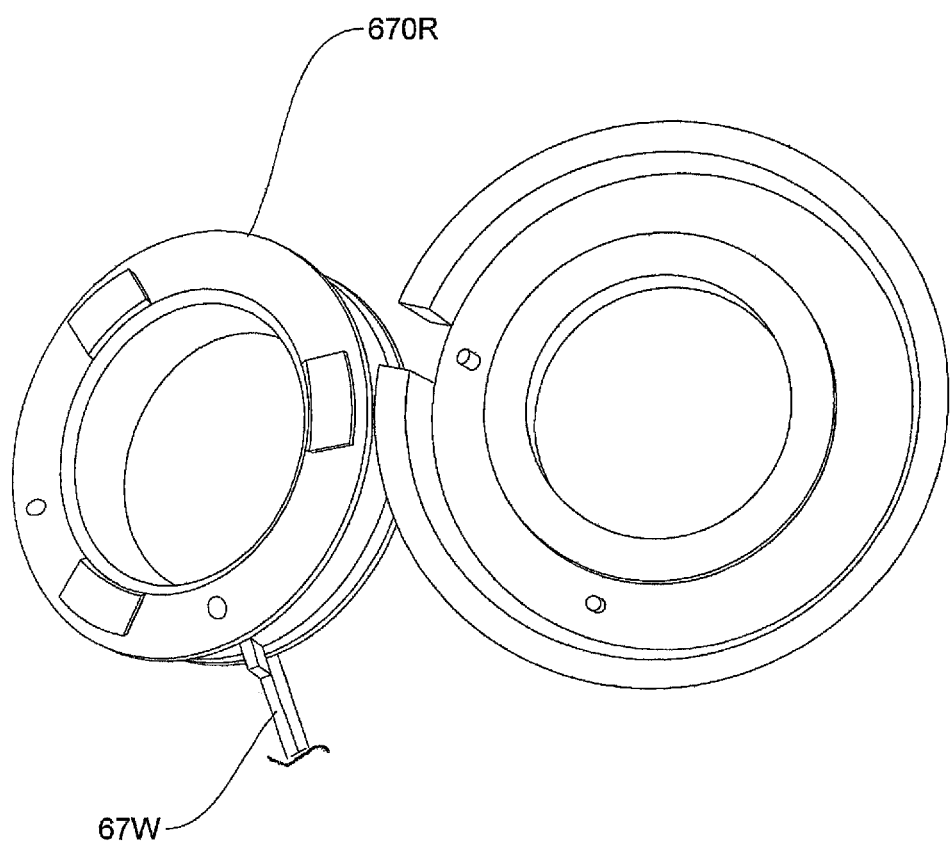
FIG. 55 is a perspective view of a prototype of the compression ring of 52A with strain gauges applied thereto and wired together with a wire bundle extending radially away from the ring, shown side by side with the top cup prior to being received therein.

The compression ring bearing element 670R may be formed similar to the other ring bearing elements discussed hereinabove (e.g., ring 452R and ring 552R), and in particular the ring bearing element 670R may be formed as shown in FIG. 52A-521H. The ring bearing element 670R may be formed to include a pair of holes 675i and 675ii, which may be slotted holes as shown in FIG. 521H. The holes 675i and 675ii may be configured to receive the anti-rotation pins 655i and 655ii therein, to prevent rotation of the ring bearing element 670R with respect to the top cup 650. When the strain gauge sensor 670 is positioned in the stack of the load cell assembly 640, the ring bearing element 670R is coupled to the top cup 650 by the anti-rotation pins 655i and 655ii being received in the holes 675i and 675ii, the stacked arrangement is prevented from rotating with respect to the cylindrical recess 621 in the suspension 620. As seen in FIG. 55, the wiring 670W from the strain gauges on the strain gauge sensor 670 may extend radially away from the ring bearing element 670R. When the load cell assembly 640 is positioned within the cylindrical recess 621 of the suspension 620, with the rectangular protrusion 653P of the top cup 650 received within the recess 623 of the suspension 620, the opening 653N of the top cup 650 will also be aligned with the recess 623, and the wiring 670W may egress through the opening 653N of the top cup 650 and pass through the recess 623 to be coupled to the electronic circuitry package 690, and may thereby be protected from crimping.

The bottom cup 660 may be formed similar to the top cup 650, and may be formed to include a cylindrical disk 661 having a particular outer diameter, and a concentric cylindrical opening 662, with a cylindrical wall 663 extending laterally away from the outer periphery of the cylindrical disk. The bottom cup 660 may also be formed with a protrusion 663P, which may be received in the recess 623 of the suspension 620, when the load cell assembly 640 is installed within the cylindrical recess 621 of the suspension 620 to prevent it from rotating. As seen in FIG. 36, when the load cell assembly 640 is installed within the recess 623 of the suspension 620, the flat side of the cylindrical disk 661 of the bottom cup 660 will contact the ring bearing element 670R, and the cylindrical wall 663 will be disposed downwardly and receives the top thrust washer 641, bottom thrust washer 642, and thrust roller bearing 643 therein.

Being so assembled, the pads 670Ri, 670Rii, and 670Riii on the first side of the ring bearing element 670R would be isolated except for the illustrated contact with the cylindrical disk 651 of the top cup 650, and the pads 670Riv, 670Rv, and 670Rvi on the second side of the ring bearing element 670R would be isolated except for the illustrated contact with the cylindrical disk 661 of the bottom cup 660, which is provided by the features and dimensions of those parts, and which prevents shunting of load away from the pads to improve the results obtained.

The nut 630 is particularly formed without a hex head for a portion thereof to be received within the cylindrical recess 623 of the suspension 620, when secured to the hook 610, which may be accomplished through hand tightening only, as discussed hereinabove.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A method of providing more accurate measurements using a load cell for off-axis loading of a hoist that includes a hook, a suspension with an orifice that receives a shaft of h hook therethrough, a nut, and a housing, said method comprising: receiving a shaft of the hook through an orifice of the suspension; receiving the shaft of the hook through an orifice of a compression ring bearing element of the load cell; positioning a first side of the compression bearing element facing towards the bottom of the suspension; positioning at least three strain gauge rosettes on a side wall of the compression ring bearing element with equal spacing between the strain gauge rosettes for forming the load cell; securing a nut onto the shaft of the hook in proximity to a second side of the compression ring bearing element; taking a plurality of uncorrected weight measurements using the load cell for a corresponding plurality of known weights, including a maximum known hoist weight and one or more intermediate known weights between the maximum known hoist weight and zero weight; comparing, using electronics, the plurality of uncorrected weight measurements from each of the at least three strain gauge rosettes with the weight values for the known weights; constructing a correction table using the compared uncorrected weight measurements and the weight values for the known weights; and dynamically adjusting a subsequent load cell measurement for an unknown weight by interpolating using the correction table, for adjusting for off-axis loading of the hook of the hoist.

2. A load cell arrangement for a hoist that includes a hook, a suspension with an orifice that receives a shaft of h hook therethrough, a nut, and a housing, said load cell arrangement comprising:
   a compression bearing element, said compression bearing element having a first side in contact with the suspension and a second side, and said compression bearing element comprising:
   an orifice configured to receive the shaft of the hook therethrough for the nut to be secured to the shaft in proximity to said second side of said compression bearing element;
   a plurality of strain gauges mounted on a side wall of said compression bearing element;
   wherein said compression bearing element comprises a cylindrical ring;
   wherein said plurality of strain gauges are located equally spaced circumferentially on said side wall of said cylindrical ring;
   wherein said cylindrical ring comprises a lower overhanging cylindrical lip and an upper overhanging cylindrical lip, each being concentric with said side wall of said cylindrical ring;
   wherein said plurality of strain gauges are mounted to said side wall between said lower overhanging cylindrical lip and said upper overhanging cylindrical lip;
   wherein the suspension comprises: a second orifice concentric with said first orifice, said second orifice configured to receive said cylindrical ring with said plurality of strain gauges mounted thereon in a clearance fit with each of said lower overhanging cylindrical lip and said upper overhanging cylindrical lip; and
   wherein said load cell arrangement further comprises: a thrust roller bearing positioned between said cylindrical ring and the nut.

3. The load cell arrangement for a hoist according to claim 2,
   further comprising: a cup member configured to house said cylindrical ring and said thrust roller bearing;
   wherein said cup member is formed of a disk, a cylindrical side wall protruding up from a periphery of said disk, and a hole formed in said disk being concentric with said cylindrical side wall of said cup member.

4. The load cell arrangement for a hoist according to claim 3, further comprising:
   a top thrust washer positioned between said cylindrical ring and said thrust roller bearing; and
   a bottom thrust washer positioned between said thrust roller bearing and said disk of said cup member.

5. The load cell arrangement for a hoist according to claim 4, wherein said cylindrical ring comprises; a corresponding plurality of contact pads formed on a top surface of said cylindrical ring and being substantially centered at each of said mounting locations of said plurality of strain gauges; and a corresponding plurality of contact pads formed on a bottom surface of said cylindrical ring, being substantially centered at each of said mounting locations of said plurality of strain gauges.

6. The load cell arrangement for a hoist according to claim 5, wherein each of said plurality of strain gauges comprises a strain gauge rosette configured to measure strain in each of a first direction, and a second direction being substantially perpendicular to said first direction.

7. The load cell arrangement for a hoist according to claim 5, wherein said plurality of strain gauges comprises three strain gauge rosettes spaced substantially 120 degrees apart on said side wall of said cylindrical ring.

8. The load cell arrangement for a hoist according to claim 5, wherein said plurality of strain gauges comprises four strain gauge rosettes spaced substantially 90 degrees apart on said side wall of said cylindrical ring.

9. The load cell arrangement for a hoist according to claim 3, wherein said cup member is formed of a hardened steel.

10. A load cell arrangement for a hoist that includes a hook, a suspension with an orifice that receives a shaft of the hook therethrough, a nut, and a housing, said load cell arrangement comprising:
   a compression bearing element, said compression bearing element comprising:
      a cylindrical ring, said cylindrical ring comprising: a side wall; and a lower overhanging cylindrical lip and an upper overhanging cylindrical lip, each being concentric with said side wall;
      an orifice configured to receive the shaft of the hook therethrough for the nut to be secured to the shaft, with a first side of said compression bearing element disposed toward the suspension and a second side of said compression bearing element disposed toward the nut; said orifice being positioned concentric with respect to said side wall;
   a plurality of strain gauges mounted on said side wall of said cylindrical ring of said compression bearing element;
   wherein said plurality of strain gauges are located equally spaced circumferentially on said side wall of said cylindrical ring;
   wherein said strain gauges are mounted to said side wall of said compression bearing element between said lower overhanging cylindrical lip and said upper overhanging cylindrical lip; and
   a thrust roller bearing, said thrust roller bearing being positioned between said compression bearing element and the nut.

11. The load cell arrangement for a hoist according to claim 10,
   further comprising: a cup member configured to house said cylindrical ring and said thrust roller bearing;
   wherein said cup member is formed of a disk, a cylindrical side wall protruding up from a periphery of said disk, and a hole formed in said disk being concentric with said cylindrical side wall of said cup member.

12. The load cell arrangement for a hoist according to claim 11, further comprising:
   a top thrust washer positioned between said cylindrical ring and said thrust roller bearing; and
   a bottom thrust washer positioned between said thrust roller bearing and said disk of said cup member.

13. The load cell arrangement for a hoist according to claim 12, wherein said cylindrical ring comprises a corresponding plurality of contact pads formed on a top surface of said cylindrical ring and being substantially centered at each of said mounting locations of said plurality of strain gauges.

14. The load cell arrangement for a hoist according to claim 13, wherein each of said plurality of strain gauges comprises a strain gauge rosette configured to measure strain in each of a first direction, and a second direction being substantially perpendicular to said first direction.

15. The load cell arrangement for a hoist according to claim 14, wherein said plurality of strain gauges comprises three strain gauge rosettes spaced substantially 120 degrees apart on said side wall of said cylindrical ring.

16. The load cell arrangement for a hoist according to claim 14, wherein said plurality of strain gauges comprises four strain gauge rosettes spaced substantially 90 degrees apart on said side wall of said cylindrical ring.

17. A load cell arrangement comprising:
   a suspension, said suspension comprising: a through hole, said through hole being centered on said suspension and being configured to receive a mounting shaft therethrough;
   a load cell, said load cell comprising:
   a top cup, said top cup comprising: a disk, a cylindrical side wall protruding down from a periphery of said disk, and a hole formed in said disk being concentric with said cylindrical side wall of said top cup;
   a compression ring, said compression ring comprising: a cylindrical side wall, a top surface, a bottom surface, and a hole configured to receive the mounting shaft therethrough, said hole being formed concentric to said cylindrical side wall;
   a plurality of strain gauges, wherein said plurality of strain gauges are mounted on said side wall of said compression ring, being equally spaced circumferentially on said side wall and positioned at a substantially central position between said
   top surface and said bottom surface;
   wherein a top portion of said compression ring is received in said top cup, with said top surface in contact with said disk;
   a bottom cup, said bottom cup comprising: a disk, a cylindrical side wall protruding down from a periphery of said disk of said bottom cup, and a hole formed in said disk of said bottom cup being concentric with said cylindrical side wall of said bottom cup;
   wherein a bottom portion of said compression ring contacts a top surface of said disk of said bottom cup;
   means for providing a clearance between each of said plurality of strain gauges on said side wall of said compression ring and an interior surface of each said cylindrical side wall of each of said top cup and said bottom cup;
   a top thrust washer, a top surface of said top thrust washer positioned adjacent to a bottom surface of said disk of said bottom cup;
   a thrust roller bearing, a top of said thrust roller bearing positioned adjacent to a bottom surface of said top thrust washer; and
   a bottom thrust washer, a top surface of said bottom thrust washer positioned adjacent to a bottom of said thrust roller bearing;
   wherein said suspension comprises: a cylindrical recess, said cylindrical recess being formed on a bottom surface of said suspension, and positioned concentric with said through hole, said cylindrical recess configured to receive said load cell therein in a clearance fit; and
   wherein a bottom surface of said bottom thrust washer is configured to be supported by a nut mounted to the mounting shaft.

* * * * *